US012606574B2

(12) United States Patent
Kim et al.

(10) Patent No.: US 12,606,574 B2
(45) **Date of Patent: *Apr. 21, 2026**

(54) TRANSITION METAL COMPOUND, METHOD FOR PREPARING THE SAME, AND CATALYST COMPOSITION COMPRISING THE SAME

(71) Applicant: LG CHEM, LTD., Seoul (KR)

(72) Inventors: Byung Seok Kim, Daejeon (KR); Minyoung Kang, Daejeon (KR); Insun Lee, Daejeon (KR); Seok Hwan Kim, Daejeon (KR); Donghyeon Gwon, Daejeon (KR); Yoonchul Jung, Daejeon (KR); Seyoung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 403 days.

This patent is subject to a terminal disclaimer.

(21) Appl. No.: 17/768,779

(22) PCT Filed: Jul. 6, 2021

(86) PCT No.: PCT/KR2021/008586

§ 371 (c)(1),
(2) Date: Apr. 13, 2022

(87) PCT Pub. No.: WO2022/030769

PCT Pub. Date: Feb. 10, 2022

(65) Prior Publication Data

US 2024/0124498 A1 Apr. 18, 2024

(30) Foreign Application Priority Data

Aug. 4, 2020 (KR) ........................ 10-2020-0097411

(51) Int. Cl.
*C07F 7/00* (2006.01)
*C08F 4/6592* (2006.01)
*C08F 210/02* (2006.01)
*C08F 210/14* (2006.01)

(52) U.S. Cl.
CPC ............ *C07F 7/00* (2013.01); *C08F 4/65927* (2013.01); *C08F 210/02* (2013.01); *C08F 210/14* (2013.01)

(58) Field of Classification Search
None
See application file for complete search history.

(56) References Cited

U.S. PATENT DOCUMENTS

| | | | |
|---|---|---|---|
| 6,476,172 | B1 | 11/2002 | Wachowicz et al. |
| 2001/0021755 | A1 | 9/2001 | Kuber et al. |
| 2004/0158010 | A1 | 8/2004 | Lehmus et al. |
| 2004/0176624 | A1 | 9/2004 | Schulte et al. |
| 2005/0182266 | A1 * | 8/2005 | Schulte .................. C08F 10/06 556/11 |
| 2006/0016967 | A1 | 1/2006 | Findlay et al. |
| 2009/0264606 | A1 | 10/2009 | Ernst et al. |
| 2011/0015353 | A1 | 1/2011 | Michel et al. |
| 2014/0121341 | A1 | 5/2014 | Holtcamp et al. |
| 2015/0307641 | A1 | 10/2015 | Bilbao et al. |
| 2016/0257703 | A1 | 9/2016 | Park et al. |
| 2017/0037165 | A1 | 2/2017 | Ajellal et al. |
| 2019/0023816 | A1 | 1/2019 | Cho et al. |
| 2019/0135961 | A1 | 5/2019 | Joung et al. |

FOREIGN PATENT DOCUMENTS

| | | | |
|---|---|---|---|
| EP | 0576970 | A1 | 1/1994 |
| EP | 2058337 | A1 | 5/2009 |
| JP | 2002-105119 | A | 4/2002 |
| JP | 2005-336091 | A | 12/2005 |
| JP | 2013-100558 | A | 5/2013 |
| JP | 2017-145303 | A | 8/2017 |
| KR | 10-1653356 | B1 | 9/2016 |
| KR | 10-1663797 | B1 | 10/2016 |
| KR | 10-2016-0147835 | A | 12/2016 |
| KR | 10-1712318 | B1 | 3/2017 |
| KR | 10-1713065 | B1 | 3/2017 |
| KR | 10-2018-0054357 | A | 5/2018 |
| KR | 10-2020-0069042 | A | 6/2020 |
| KR | 10-2020-0077331 | A | 6/2020 |
| WO | 02/090399 | A1 | 11/2002 |
| WO | 02/096920 | A1 | 12/2002 |
| WO | 03/106470 | A1 | 12/2003 |
| WO | 2004/101673 | A2 | 11/2004 |
| WO | 2006/065906 | A2 | 6/2006 |
| WO | 2008/080886 | A1 | 7/2008 |
| WO | 2009/059971 | A1 | 5/2009 |
| WO | 2014/070655 | A1 | 5/2014 |
| WO | 2015/142547 | A1 | 9/2015 |
| WO | 2017/188588 | A1 | 11/2017 |

OTHER PUBLICATIONS

International Search Report (with partial translation) and Written Opinion dated Oct. 26, 2021, for corresponding International Patent Application No. PCT/KR2021/008586.
O'Reilly et al., "β-Alkyl Elimination: Fundamental Principles and Some Applications," Chem. Rev., 116(14): 8105-8145 (2016).
Office Action dated Feb. 11, 2025 issued in corresponding Korean Patent Application No. 10-2020-0097413.

* cited by examiner

*Primary Examiner* — Yun Qian
(74) *Attorney, Agent, or Firm* — Morgan, Lewis & Bockius LLP

(57) ABSTRACT

Disclosed is a transition metal compound that exhibits high activity and high comonomer incorporation in olefin polymerization and can be used for preparing a polyolefin having a BOCD structure, a method for preparing the same, and a catalyst composition including the same.

13 Claims, No Drawings

TRANSITION METAL COMPOUND, METHOD FOR PREPARING THE SAME, AND CATALYST COMPOSITION COMPRISING THE SAME

CROSS-REFERENCE TO RELATED APPLICATION(S)

This application claims the benefit of Korean Patent Application No. 10-2020-0097411 filed on Aug. 4, 2020 with the Korean Intellectual Property Office, the disclosures of which are incorporated herein by reference in their entirety.

TECHNICAL FIELD

The present disclosure relates to a novel transition metal compound, a method for preparing the same, and a catalyst composition including the same.

BACKGROUND OF ART

Olefin polymerization catalyst systems may be divided into Ziegler-Natta and metallocene catalysts, and these highly active catalyst systems have been developed in accordance with their characteristics.

Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

Meanwhile, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, due to the single site characteristics. The stereoregularity, copolymerization characteristics, molecular weight, crystallinity, etc. of the resulting polymer may be controlled by changing a ligand structure of the catalyst and polymerization conditions.

Meanwhile, there is still a demand for a polyolefin polymer having a broad molecular weight distribution while containing a large amount of comonomer in the polyolefin at high molecular weight side, that is, a polyolefin with a reinforced BOCD (Broad Orthogonal Comonomer Distribution) structure. The polyolefin having such a structure can be suitably used as a product for injection, because its mid-to-long-term durability is strengthened. Accordingly, efforts to develop a metallocene catalyst capable of providing a polyolefin having a BOCD structure are continuing, and in particular, the high molecular weight and high comonomer incorporation metallocene catalysts are not diverse, and the development thereof is required.

DETAILED DESCRIPTION OF THE INVENTION

Technical Problem

In the present disclosure, there are provided a novel high molecular weight, high comonomer incorporation transition metal compound which can be used for preparing a polyolefin having a BOCD structure, a method for preparing the same, and a catalyst composition including the same.

Technical Solution

According to an embodiment of the present disclosure, there is provided a transition metal compound represented by the following Chemical Formula 1:

[Chemical Formula 1]

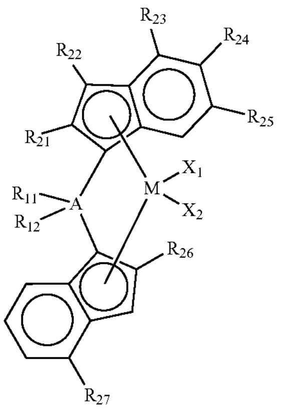

in Chemical Formula 1,

M is a Group 4 transition metal, $X^1$ and $X^2$ are each independently hydrogen; halogen; or $C_{1-20}$ alkyl;

A is carbon, or silicon, $R_{11}$ and $R_{12}$ are each independently hydrogen; halogen; $C_{1-20}$ alkyl; $C_{2-20}$ alkoxyalkyl; or $C_{6-20}$ aryl;

$R_{21}$ is methyl, $R_{22}$ is $C_{3-20}$ alkyl; $C_{3-20}$ alkoxyalkyl; or $C_{3-20}$ alkenyl, $R_{23}$ is unsubstituted $C_{6-20}$ aryl; or $C_{7-20}$ alkylaryl, $R_{24}$ and $R_{25}$ are each hydrogen; or $R_{24}$ and $R_{25}$ are connected with each other to form a $C_{3-10}$ cycloalkane ring, $R_{26}$ is $C_{1-20}$ alkyl, and $R_{27}$ is unsubstituted $C_{6-20}$ aryl; or $C_{7-20}$ alkylaryl.

According to another embodiment of the present disclosure, there is provided a method for preparing the transition metal compound of Chemical Formula 1, including the steps of preparing a compound represented by the following Chemical Formula 1-1 by reacting a compound represented by the following Chemical Formula a with a compound represented by the following Chemical Formula b; preparing a compound represented by the following Chemical Formula 1-2 by reacting a compound represented by the following Chemical Formula 1-1 with a compound represented by the following Chemical Formula 1-11; and preparing a compound represented by the following Chemical Formula 1 by reacting a compound represented by the following Chemical Formula 1-2 with a compound represented by the following Chemical Formula 1-21:

a

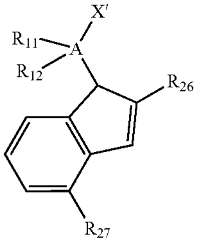

b

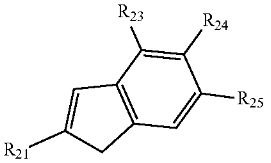

1-1

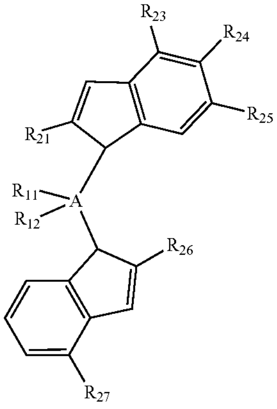

1-11

$X'—R_{22}$ 1-2

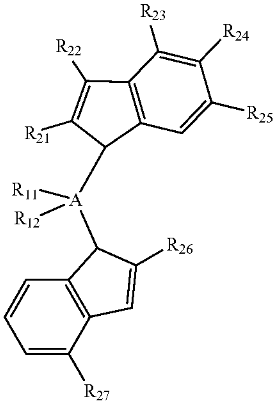

1-21

$M(X_1)(X_2)(X')_2$

-continued

1

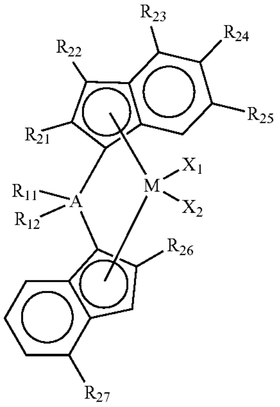

wherein,

M, $X_1$, $X_2$, A, $R_{11}$, $R_{12}$, and $R_{21}$ to $R_{27}$ are as defined in Chemical Formula 1, and each X' is independently halogen.

According to another embodiment of the present disclosure, there is provided a catalyst composition including the transition metal compound of Chemical Formula 1.

According to another embodiment of the present disclosure, there is provided a method for preparing a polyolefin, including a step of polymerizing olefinic monomers in the presence of the above catalyst composition.

Advantageous Effect

The transition metal compound of the present disclosure exhibits high catalytic activity, high comonomer incorporation when used as a polymerization catalyst for polyolefin production, and thus can be used for preparing a polyolefin having a BOCD structure.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms “include”, “comprise”, or “have” when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present invention will be described in detail.

In the present disclosure, the substituents of Chemical Formula will be described in more detail as follows.

The halogen may be fluorine (F), chlorine (Cl), bromine (Br) or iodine (I).

The $C_{1-20}$ alkyl may be linear, branched or cyclic alkyl. Specifically, the $C_{1-20}$ alkyl may be $C_{1-20}$ linear alkyl; $C_{1-10}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. More specifically, the $C_{1-20}$ alkyl may be methyl, ethyl, n-propyl, iso-propyl, n-butyl, iso-butyl, tert-butyl, n-pentyl, iso-pentyl, cyclohexyl, or the like, but is not limited thereto.

The $C_{2-20}$ alkenyl may be linear, branched, or cyclic alkenyl. Specifically, the $C_{2-20}$ alkenyl may be $C_{2-20}$ linear alkenyl; $C_{2-10}$ linear alkenyl; $C_{2-5}$ linear alkenyl; $C_{3-20}$ branched alkenyl; $C_{3-15}$ branched alkenyl; $C_{3-10}$ branched alkenyl; $C_{5-20}$ cyclic alkenyl; or $C_{5-10}$ cyclic alkenyl. More specifically, the $C_{2-20}$ alkenyl may be ethenyl, propenyl, butenyl, pentenyl, cyclohexenyl, or the like.

The $C_{1-20}$ alkoxy may be linear, branched, or cyclic alkoxy. Specifically, the $C_{1-20}$ alkoxy may be $C_{1-20}$ linear alkoxy; $C_{1-10}$ linear alkoxy; $C_{1-5}$ linear alkoxy; $C_{3-20}$ branched or cyclic alkoxy; $C_{3-15}$ branched or cyclic alkoxy; or $C_{3-10}$ branched or cyclic alkoxy. More specifically, the $C_{1-20}$ alkoxy may be methoxy, ethoxy, n-propoxy, isopropoxy, n-butoxy, iso-butoxy, tert-butoxy, n-pentoxy, isopentoxy, neo-pentoxy, cyclohexyloxy, or the like.

The $C_{2-20}$ alkoxyalkyl may have a structure including $-R_y-O-R_z$, and may be a substituent in which one or more hydrogens of alkyl ($-R_y$) are substituted with alkoxy ($-O-R_z$). Specifically, the $C_{2-20}$ alkoxyalkyl may be methoxymethyl, methoxyethyl, ethoxymethyl, iso-propoxymethyl, iso-propoxyethyl, iso-propoxyhexyl, tert-butoxymethyl, tert-butoxyethyl, tert-butoxyhexyl, or the like.

The $C_{6-20}$ aryl may be a monocyclic, bicyclic or tricyclic aromatic hydrocarbon. Specifically, the $C_{6-20}$ aryl may be phenyl, naphthyl, anthracenyl, or the like.

The $C_{7-20}$ alkylaryl may be a substituent in which one or more hydrogens of the aryl is substituted with alkyl. Specifically, the $C_{7-20}$ alkylaryl may be methylphenyl, ethylphenyl, n-propylphenyl, iso-propylphenyl, n-butylphenyl, iso-butylphenyl, tert-butylphenyl, cyclohexylphenyl, or the like.

The Group 4 transition metal may be titanium, zirconium, and hafnium.

The transition metal compound represented by Chemical Formula 1 includes two indene ligands. Specifically, one of the two indene rings has a methyl group at the 2nd position, a chain-type substituent having 3 or more carbon atoms at the 3rd position, and a substituent having large steric hindrance at the 4th position. In addition, the other indene ring includes a substituent only at the 2nd and 4th positions, and has a structure including a substituent having large steric hindrance at the 4th position.

Due to the above structural characteristics, the transition metal compound of Chemical Formula 1 exhibits high activity in polymerization of olefinic monomers, as well as high comonomer incorporation with respect to alpha-olefins, thereby preparing a high molecular weight polyolefin having a high short chain branch (SCB) content.

As such, the transition metal compound represented by Chemical Formula 1 exhibits relatively high comonomer incorporation in the polyolefin at high molecular weight side. Accordingly, it may provide a polyolefin having a structure in which comonomers such as alpha-olefin are incorporated predominantly in high-molecular-weight main chains, that is, a BOCD (broad orthogonal co-monomer distribution) structure in which the SCB content increases as the molecular weight increases.

In the transition metal compound represented by Chemical Formula 1, the central metal M is a Group 4 transition metal, and may preferably be zirconium (Zr) or hafnium (Hf).

Preferably, $X_1$ and $X_2$ are each independently halogen, and more preferably, both may be chlorine (Cl).

Preferably, A is silicon.

Preferably, $R_{11}$ and $R_{12}$ are each independently $C_{1-10}$ alkyl; $C_{2-10}$ alkoxyalkyl; or $C_{6-10}$ aryl. Preferably, $R_{11}$ and $R_{12}$ are each independently methyl; ethyl; n-propyl; n-butyl; n-pentyl; n-hexyl; t-butoxyhexyl; or phenyl.

More preferably, M is zirconium (Zr) or hafnium (Hf), both of $X_1$ and $X_2$ are chlorine, A is silicon, and $R_{11}$ and $R_{12}$ are each independently methyl; ethyl; n-propyl; n-butyl; n-pentyl; n-hexyl; t-butoxyhexyl; or phenyl.

Preferably, $R_{22}$ is $C_{3-10}$ alkyl; $C_{3-10}$ alkoxyalkyl, or $C_{3-10}$ alkenyl. Preferably, $R_{22}$ is $C_{4-10}$ alkyl; $C_{5-10}$ alkoxyalkyl; or $C_{3-8}$ alkenyl. More preferably, $R_{22}$ is butyl; t-butoxyhexyl; or 2-propenyl.

Preferably, $R_{23}$ is unsubstituted phenyl; or phenyl substituted with alkyl. More preferably, $R_{23}$ is phenyl; or t-butylphenyl.

Preferably, $R_{24}$ and $R_{25}$ are each hydrogen; or $R_{24}$ and $R_{25}$ are connected with each other to form a cyclopentane ring, or a cyclohexane ring.

Preferably, $R_{27}$ is unsubstituted phenyl; or phenyl substituted with $C_{1-10}$ alkyl. More preferably, $R_{27}$ is phenyl; or t-butylphenyl.

According to one embodiment, in Chemical Formula 1, $R_{11}$ and $R_{12}$ are each independently $C_{1-10}$ alkyl; $C_{2-10}$ alkoxyalkyl; or $C_{6-10}$ aryl;

$R_{22}$ is $C_{3-10}$ alkyl; $C_{3-10}$ alkoxyalkyl; or $C_{3-10}$ alkenyl;

$R_{23}$ is unsubstituted phenyl; or phenyl substituted with $C_{1-10}$ alkyl, $R_{24}$ and $R_{25}$ are each hydrogen; or $R_{24}$ and $R_{25}$ are connected with each other to form a cyclopentane ring, or a cyclohexane ring, and $R_{27}$ is unsubstituted phenyl; or phenyl substituted with $C_{1-10}$ alkyl.

Preferably, in Chemical Formula 1, M is zirconium or hafnium, $X_1$ and $X_2$ are each independently halogen, A is silicon, $R_{11}$ and $R_{12}$ are each independently $C_{1-10}$ alkyl; $C_{2-10}$ alkoxyalkyl, or $C_{6-10}$ aryl, $R_{22}$ is $C_{3-10}$ alkyl; $C_{3-10}$ alkoxyalkyl; or $C_{3-10}$ alkenyl, $R_{23}$ is unsubstituted phenyl; or phenyl substituted with $C_{1-10}$ alkyl, $R_{24}$ and $R_{25}$ are each hydrogen; or $R_{24}$ and $R_{25}$ are connected with each other to form a cyclopentane ring, or a cyclohexane ring, and $R_{27}$ is unsubstituted phenyl; or phenyl substituted with $C_{1-10}$ alkyl.

More preferably, in Chemical Formula 1, M is zirconium (Zr) or hafnium (Hf), both of $X_1$ and $X_2$ are chlorine, A is silicon, $R_{11}$ and $R_{12}$ are each independently methyl; ethyl; n-propyl; n-butyl; n-pentyl; n-hexyl; t-butoxyhexyl; or phenyl;

$R_{22}$ is butyl; t-butoxyhexyl; or 2-propenyl;

$R_{23}$ is phenyl; or t-butylphenyl, $R_{24}$ and $R_{25}$ are each hydrogen; or $R_{24}$ and $R_{25}$ are connected with each other to form a cyclopentane ring, and $R_{27}$ is phenyl; or t-butylphenyl.

The transition metal compound represented by the Chemical Formula 1 may be any one selected from the group consisting of:
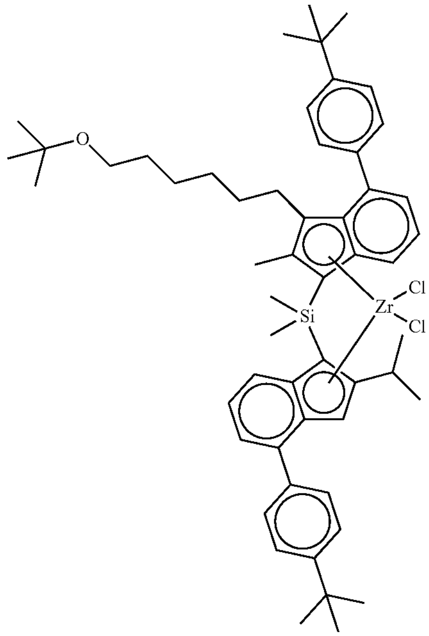
-continued
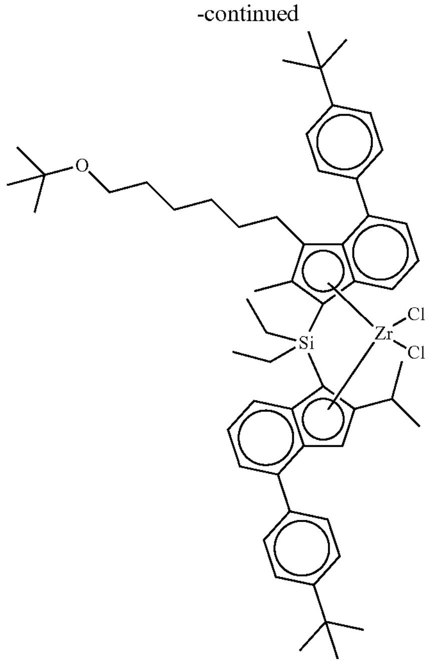
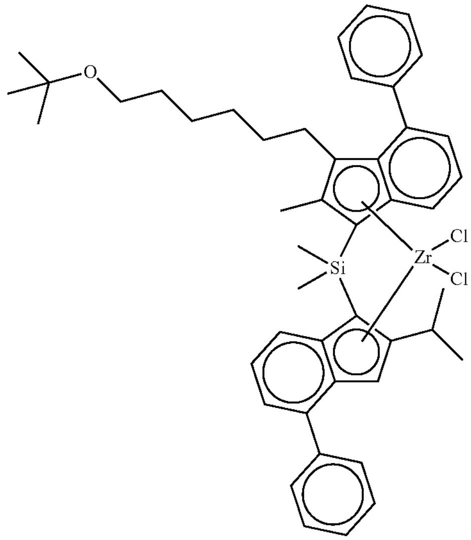
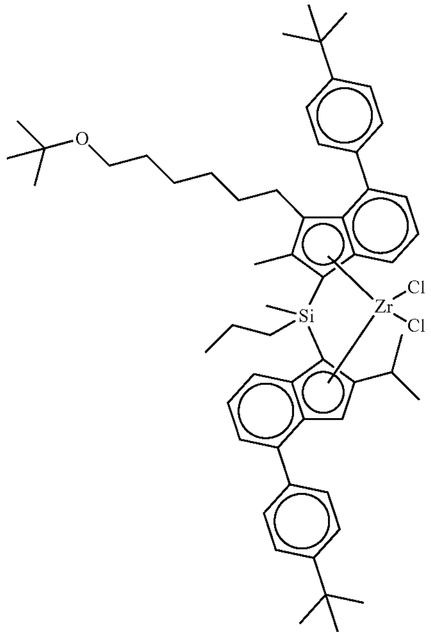

-continued
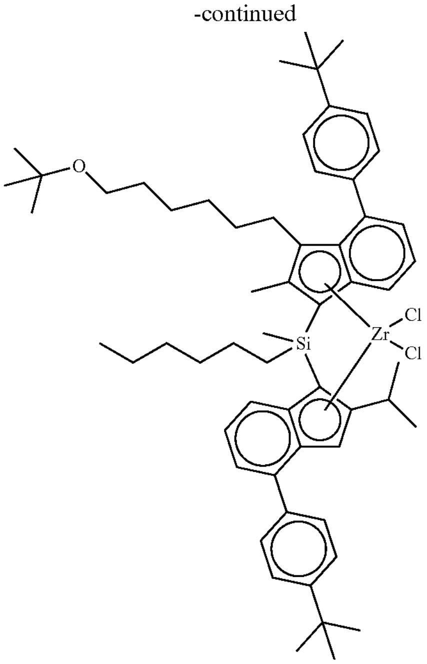
-continued
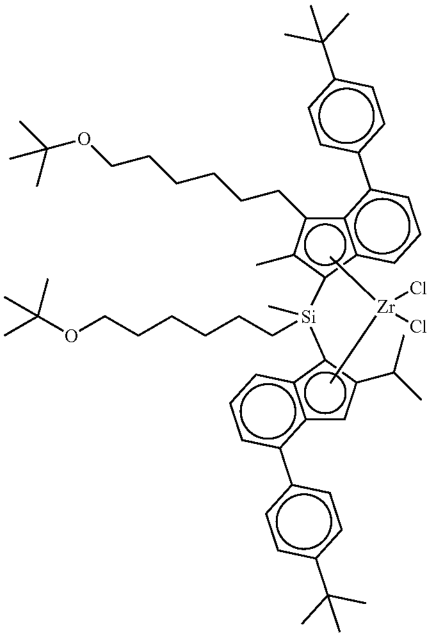
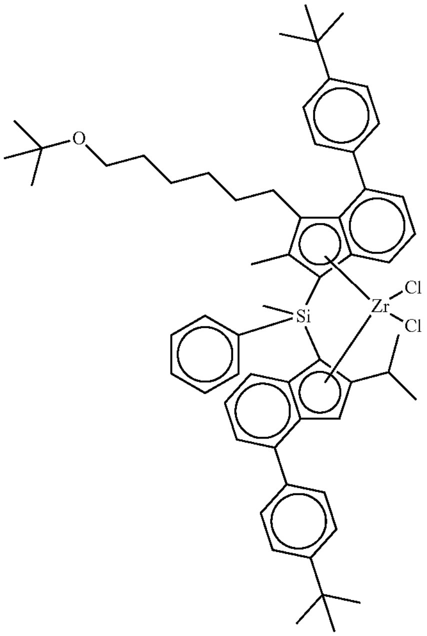
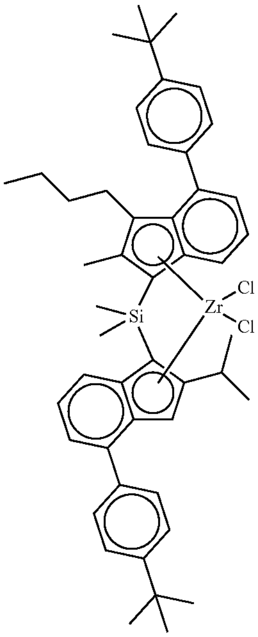

-continued
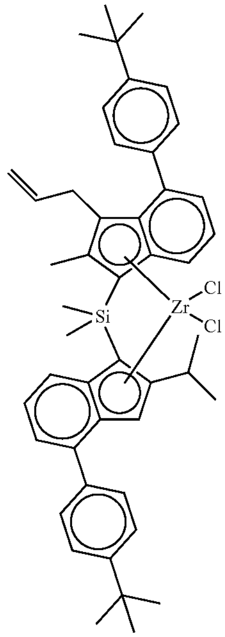
-continued
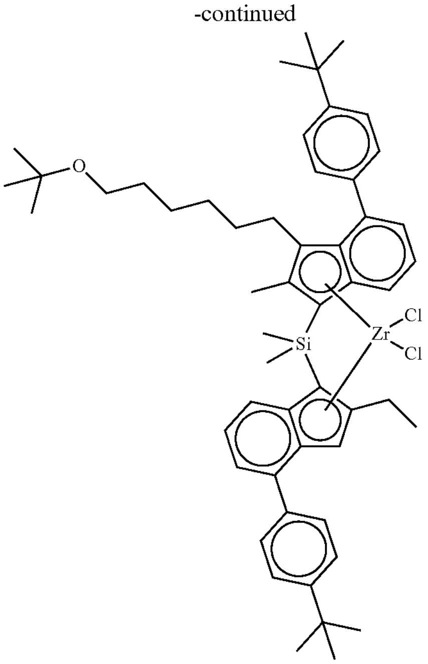
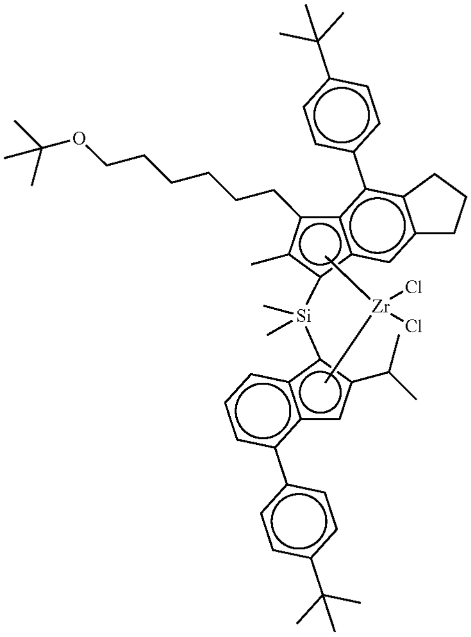
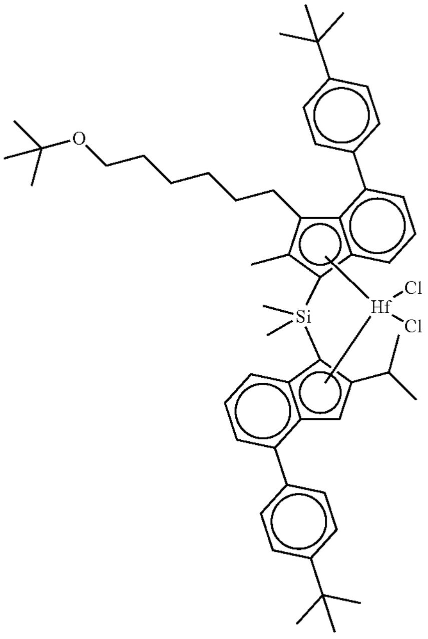

-continued

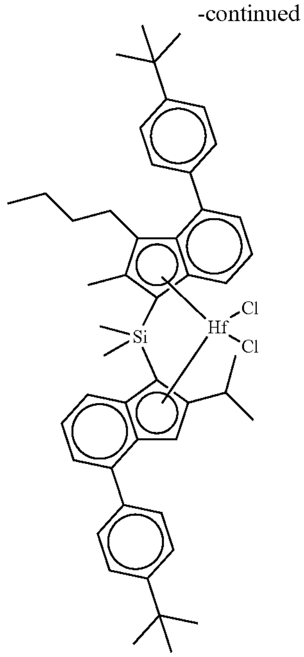

Meanwhile, the method for preparing the compound represented by Chemical Formula 1 is not particularly limited, but the compound may be prepared by, for example, the method shown in Reaction Scheme 1 below.

It is difficult to synthesize the compound represented by Chemical Formula 1 due to steric hindrance of the indene ligand, but the method shown in Reaction Scheme 1 may prepare the compound of Chemical Formula 1 in high yield and high purity.

According to one embodiment of the present disclosure, the compound represented by Chemical Formula 1 may be prepared including the steps of:

preparing a compound represented by Chemical Formula 1-1 by reacting a compound represented by Chemical Formula a with a compound represented by Chemical Formula b;

preparing a ligand represented by Chemical Formula 1-2 by reacting a compound represented by Chemical Formula 1-1 with a compound represented by Chemical Formula 1-11; and reacting a ligand represented by Chemical Formula 1-2 with a halogen salt of a transition metal represented by Chemical Formula 1-21.

[Reaction Scheme 1]

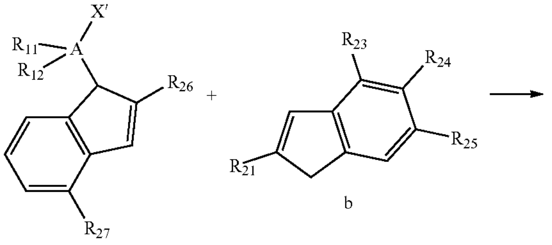

a b

-continued

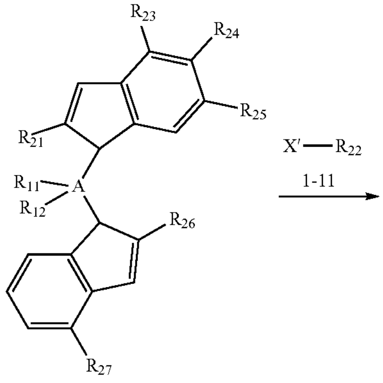

1-1

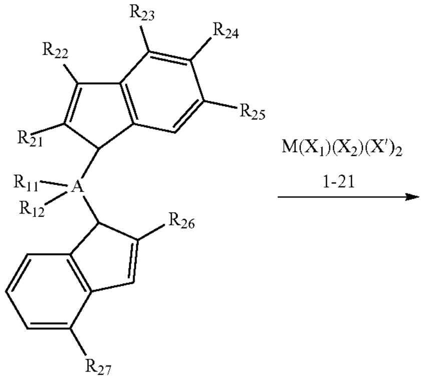

1-2

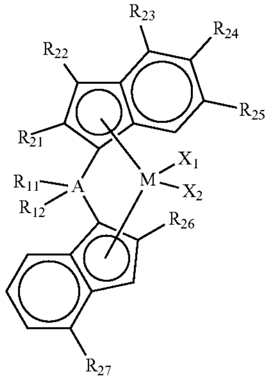

1

In Reaction Scheme 1,

M, $X_1$, $X_2$, A, $R_{11}$, $R_{12}$, and $R_{21}$ to $R_{27}$ are as defined in Chemical Formula 1, and each X' is independently halogen.

The compound of Chemical Formula 1 includes substituents having large steric hindrance ($R_{23}$ and $R_{27}$) at the 4th position of the indene ligand. Accordingly, as shown in Reaction Scheme 1, the yield of the ligand can be increased by first linking two indene ligands with a bridging group (-A($R_{11}$)($R_{12}$)—) and then introducing a substituent of $R_{22}$.

Herein, the indene ligand a to which the bridging group is bonded may be prepared by reacting an indene ligand with a bridging group-providing compound such as a halogenated silane, as shown in Reaction Scheme 1-1 below.

[Reaction Scheme 1-1]

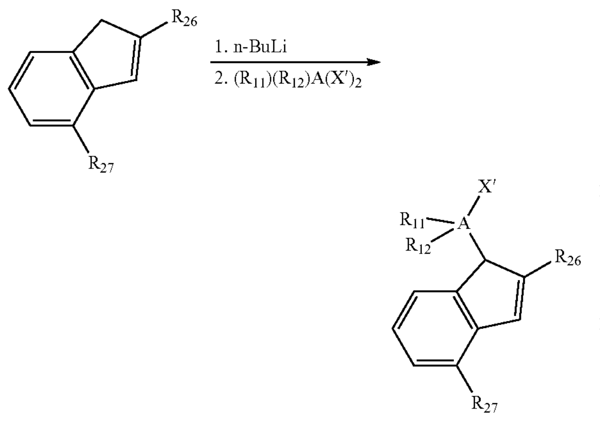

a in Reaction Scheme 1-1,

X', A, $R_{11}$, $R_{12}$, $R_{26}$, and $R_{27}$ are as described in Chemical Formula 1.

Each step of Reaction Scheme 1 may be performed in the presence of an organic base such as alkyl lithium having 1 to 10 carbon atoms, and the step of preparing the compound of Chemical Formula 1-1 may be performed in the presence of the organic base and an inorganic copper salt such as CuCN.

The reaction of each step may be performed by applying known reactions, and the more detailed synthesis method can be referred to Examples to be described later.

Meanwhile, according to another embodiment of the present disclosure, there is provided a catalyst composition including the above-described transition metal compound.

Specifically, the catalyst composition according to an embodiment of the present disclosure may include the transition metal compound of Chemical Formula 1 as a single catalyst.

In this case, the catalyst composition may include the transition metal compound as a single component, and may be in the form of a supported metallocene catalyst including the transition metal compound and a support. When the catalyst composition is used in the form of a supported metallocene catalyst, it is possible to achieve excellent morphology and physical properties of the polypropylene to be prepared, and it may be suitably used for slurry polymerization, bulk polymerization, and gas phase polymerization.

Specifically, a support having a highly reactive hydroxyl group, silanol group or siloxane group on its surface may be used as the support. The support may be surface-modified by calcination, or may be dried to remove moisture from the surface. For example, the support may be silica prepared by calcining silica gel, silica dried at high temperatures, silica-alumina, silica-magnesia, or the like, and it may usually contain oxides, carbonates, sulfates, or nitrates such as $Na_2O$, $K_2CO_3$, $BaSO_4$, $Mg(NO_3)_2$ and the like.

The support is preferably calcined or dried at about 200 to about 700° C., more preferably about 250 to about 650° C. When the temperature is excessively low, the support contains too much moisture, so that the moisture on the surface may react with the cocatalyst. In addition, a cocatalyst supporting ratio may be relatively high due to excess hydroxyl groups, but this requires a large amount of cocatalyst. When the temperature is excessively high, pores on the surface of the support may be combined with each other to reduce surface area, and many hydroxyl groups or silanol groups may be lost from the surface, leaving only siloxane groups. Thus, reactive sites with cocatalyst may be reduced, which is not preferable.

For example, the amount of hydroxyl groups on the surface of the support may be 0.1 to 10 mmol/g, or 0.5 to 5 mmol/g. The amount of hydroxyl groups may be controlled by the preparation method, preparation conditions, or drying conditions such as temperature, time, vacuum or spray drying of the support. When the amount of hydroxyl groups is excessively low, reactive sites with cocatalyst may be insufficient. When the amount of hydroxyl groups is excessively high, it may be caused by moisture besides the hydroxyl groups present on the surface of support particles, which is not desirable.

Among the above-mentioned supports, the silica prepared by calcining silica, particularly silica gel, has little catalyst released from the surface of the support in the polymerization process of the olefin, because the functional groups of the compound represented by Chemical Formula 1 are chemically bonded to and supported on the silica support. As a result, when the polyolefin is prepared by slurry polymerization or gas phase polymerization, a fouling phenomenon, sticking to the wall surface of the reactor or with each other, may be minimized.

In addition, when supported on the support, the compound represented by Chemical Formula 1 may be supported in an amount of about 30 μmol or more, or about 40 μmol or more, and about 120 μmol or less, or about 80 μmol or less based on a weight of the support, for example, about 1 g of silica. When supported in the above range, the supported catalyst may exhibit appropriate activity, which may be advantageous for maintaining catalytic activity and economic efficiency.

In addition, the catalyst composition may further include at least one cocatalyst together with the above-described transition metal compound and the support.

In addition, the hybrid supported catalyst according to an embodiment of the present disclosure may further include a cocatalyst in addition to the transition metal compound represented by Chemical Formula 1 and the support. The cocatalyst may include at least one of compounds represented by the following Chemical Formula 3 or Chemical Formula 4.

$$-[Al(R_{31})-O]_m- \quad \text{[Chemical Formula 3]}$$

in Chemical Formula 3, $R^{31}$ are the same as or different from each other, and are each independently halogen, $C_{1-20}$ alkyl or $C_{1-20}$ haloalkyl; and m is an integer of 2 or more.

Examples of the compound represented by Chemical Formula 3 may include aluminoxane-based compounds such as methylaluminoxane, ethylaluminoxane, isobutylaluminoxane, or butylaluminoxane, and any one or a mixture thereof may be used.

$$J(R_{32})_3 \quad \text{[Chemical Formula 4]}$$

in Chemical Formula 4, $R^{32}$ are the same as or different from each other, and are each independently halogen, $C_{1-20}$ alkyl or $C_{1-20}$ haloalkyl; and J is aluminum or boron.

Examples of the compound represented by Chemical Formula 4 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and the like, and a more preferred compound is selected from trimethylaluminum, triethylaluminum, and triisobutylaluminum.

The cocatalyst may be supported in an amount of 1 mmol or more, or 3 mmol or more; and 25 mmol or less, or 20 mmol or less based on a weight of the support, for example, 1 g of support. When supported within the above range, it is possible to obtain an effect of improving catalytic activity as well as an effect of reducing the generation of fine particles.

As described above, the catalyst composition according to an embodiment of the present disclosure includes the transition metal compound of Chemical Formula 1, and thus exhibits excellent catalytic activity for olefin polymerization. Accordingly, the catalyst composition may be suitably used for polymerization of olefinic monomers.

Accordingly, in an embodiment of the present disclosure, there is provided a method for preparing a polyolefin, including a step of polymerizing olefinic monomers in the presence of the catalyst composition.

The olefinic monomer may be ethylene, alpha-olefin, cyclic olefin, diene olefin or triene olefin having two or more double bonds.

For example, the olefinic monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene, and may be copolymerized by mixing two or more of these monomers. According to an embodiment of the present disclosure, the monomer may be at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene and 1-eicosene.

The polymerization reaction may be performed by homopolymerization with one olefinic monomer or copolymerization with two or more types of monomers using a continuous slurry polymerization reactor, a loop slurry reactor, a gas phase reactor, or a solution reactor.

In addition, the catalyst composition may be dissolved or diluted in a C4 to C12 aliphatic hydrocarbon solvent such as isobutane, pentane, hexane, heptane, nonane, decane and an isomer thereof, in an aromatic hydrocarbon solvent such as toluene and benzene, or in a hydrocarbon solvent substituted with chlorine such as dichloromethane and chlorobenzene, and then injected. The solvent used herein is preferably used after removing a small amount of water or air, which acts as a catalyst poison, by treating with a small amount of alkyl aluminum. It is also possible to further use the cocatalyst.

The polymerization may be performed at a temperature of 40° C. or more, or 60° C. or more, and 120° C. or less, or 100° C. or less. In addition, the polymerization may be performed at a pressure of 1 bar or more, or 5 bar or more, and 70 bar or less, or 40 bar or less.

The transition metal compound of Chemical Formula 1 exhibits high activity for olefin polymerization and high comonomer incorporation with respect to copolymerization of ethylene and alpha-olefin. Therefore, it may be suitably used for preparing a polyolefin having a BOCD structure as a high molecular weight and high comonomer incorporation catalyst.

Specifically, the ethylene-1-hexene copolymer prepared in the presence of the transition metal compound of Chemical Formula 1 may have a weight average molecular weight of 400,000 g/mol or more, 450,000 g/mol or more, or 500,000 g/mol or more, and 1,000,000 g/mol or less, 800,000 g/mol or less, or 700,000 g/mol or less.

The weight average molecular weight can be measured using gel permeation chromatography (GPC, manufactured by Water). Specifically, PL-GPC220 manufactured by Waters may be used as the gel permeation chromatography (GPC) instrument, and a Polymer Laboratories PLgel MIX-B 300 mm length column may be used. An evaluation temperature may be 160° C., and 1,2,4-trichlorobenzene may be used for a solvent at a flow rate of 1 mL/min. Each polypropylene sample may be pretreated by dissolving it in 1,2,4-trichlorobenzene containing 0.0125% of BHT at 160° C. for 10 hours using a GPC analyzer (PL-GP220), and the sample with a concentration of 10 mg/10 mL may be supplied in an amount of 200 μL. Mw and Mn may be obtained using a calibration curve formed using a polystyrene standard. 9 kinds of the polystyrene standard may be used with the molecular weight of 2,000 g/mol, 10,000 g/mol, 30,000 g/mol, 70,000 g/mol, 200,000 g/mol, 700,000 g/mol, 2,000,000 g/mol, 4,000,000 g/mol, and 10,000,000 g/mol.

In addition, the ethylene-1-hexene copolymer prepared in the presence of the transition metal compound of Chemical Formula 1 has a high SCB (short chain branch) content. Herein, the short chain branch (SCB) refers to a branch having 2 to 7 carbon atoms attached to the main chain, and means a branch usually formed when an alpha-olefin having 4 or more carbon atoms, such as 1-butene, 1-hexene, and 1-octene, is used as a comonomer.

Specifically, the ethylene-1-hexene copolymer prepared in the presence of the transition metal compound of Chemical Formula 1 of the present disclosure has a SCB content of 4.0 branches or more, 4.2 branches or more, or 4.5 branches or more and 7.0 branches or less, 6.5 branches or less, or 6.0 branches or less per 1000 carbon atoms.

Hereinafter, the present invention will be described in more detail with the following preferred examples, but these examples are provided for illustrative purposes only. It is apparent to those skilled in the art that various changes and modifications can be made within the scope and spirit of the present invention. Therefore, it is obvious that the changes and modifications are within the scope of the present invention.

EXAMPLES
Preparation of Transition Metal Compound
Example 1
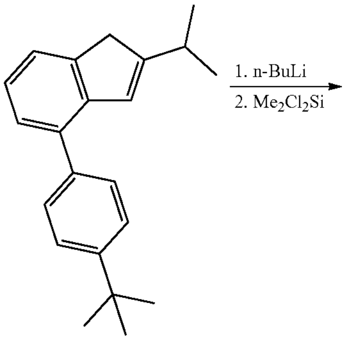
-continued
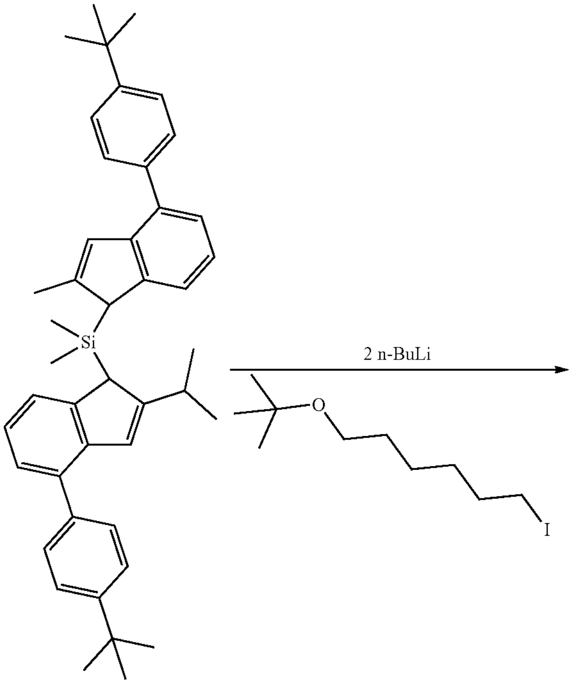
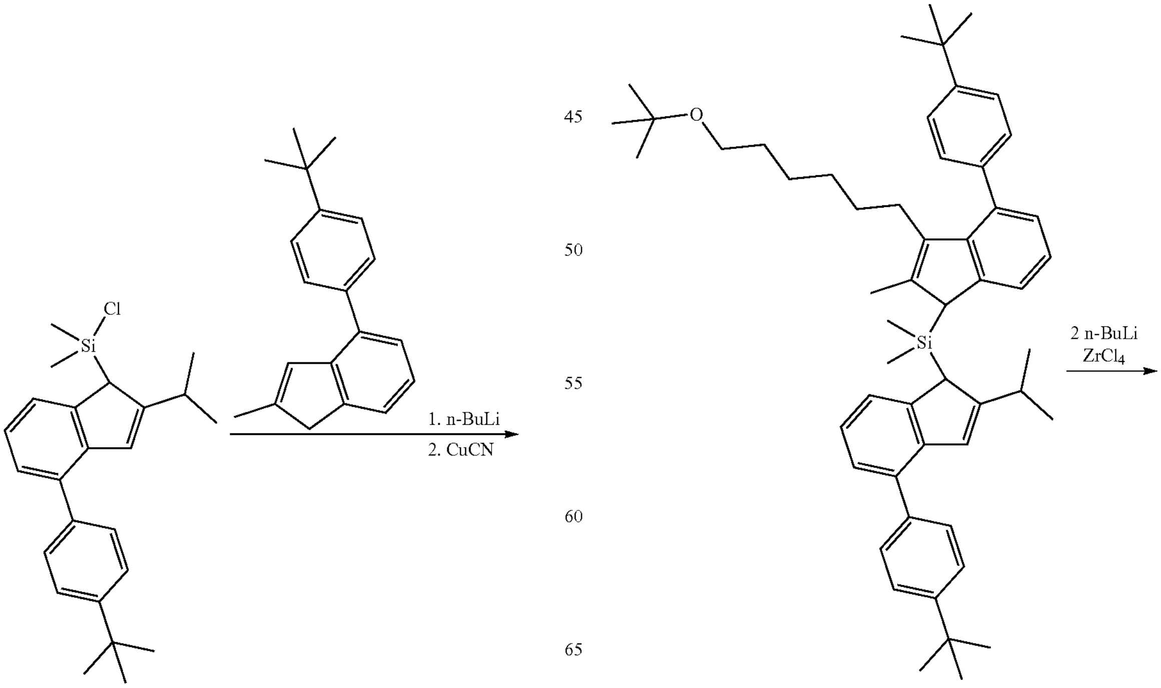

-continued

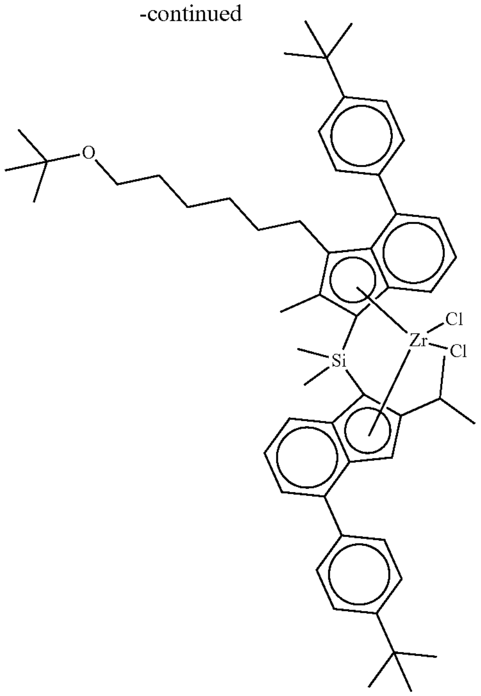

Preparation of (3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl)dimethylsilane 2-iPr-4-tBu-Phenyl Indene (1 eq; hereinafter, eq means a molar equivalent weight (eq/mol)) was dissolved in a mixed solvent of toluene:tetrahydrofuran (THF) (10:1 by volume, 0.5 M; hereinafter, all ratios of solvents are expressed in volume ratios, and the molarity means the number of moles (mol) of the solute with respect to 1 L of the solvent mixed in the corresponding volume ratio), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature.

In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, tert-ButoxyHexyl-Iodide (1.05 eq) was dissolved in THF (0.6 M) and added thereto at −25° C. Then, it was stirred overnight at room temperature, worked-up with water, and then dried to obtain a ligand.

Preparation of dimethyl-silanediyl(3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl) Zirconium dichloride The ligand was dissolved in a mixed solvent of toluene:ether (2:1 by volume, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and dichloromethane (DCM) was added again. Then, LiCl was removed through a filter, and the filtrate was vacuum-dried. Subsequently, after recrystallization using hexane and DCM, the resulting solid was filtered and vacuum-dried to obtain a solid transition metal compound.

$^1$H-NMR (500 MHz, $CDCl_3$): 8.30 (d, 2H), 7.29-7.39 (m, 12H), 6.36 (s, 1H), 3.51 (t, 2H), 2.38 (m, 1H), 2.12 (s, 3H), 1.92 (m, 2H), 1.40-1.50 (m, 8H), 1.31 (s, 18H), 0.91 (d, 6H), 0.86 (s, 6H)

Example 2

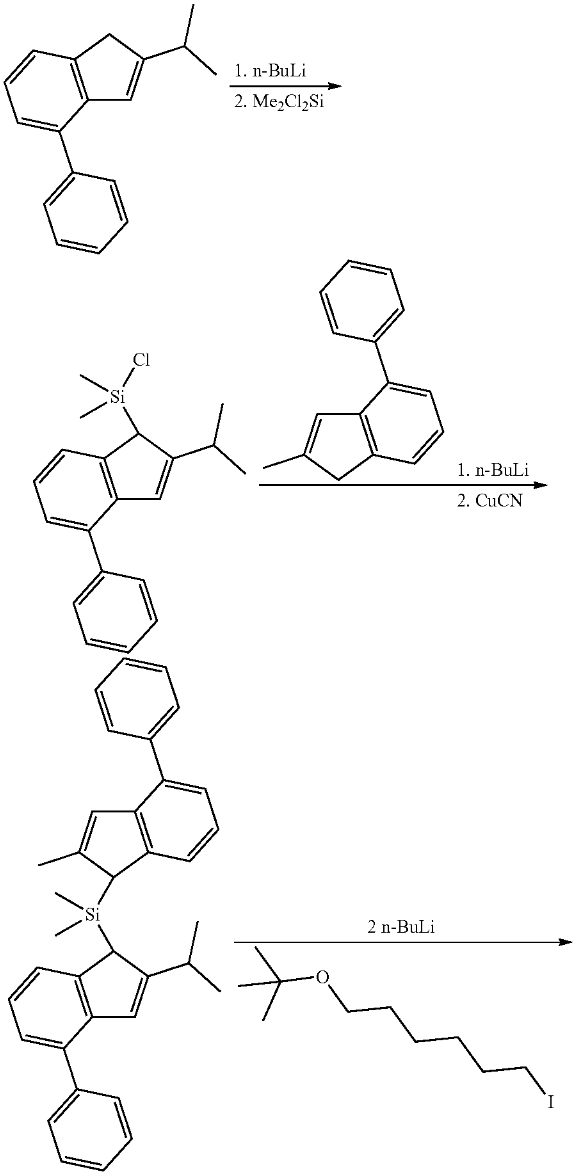

-continued

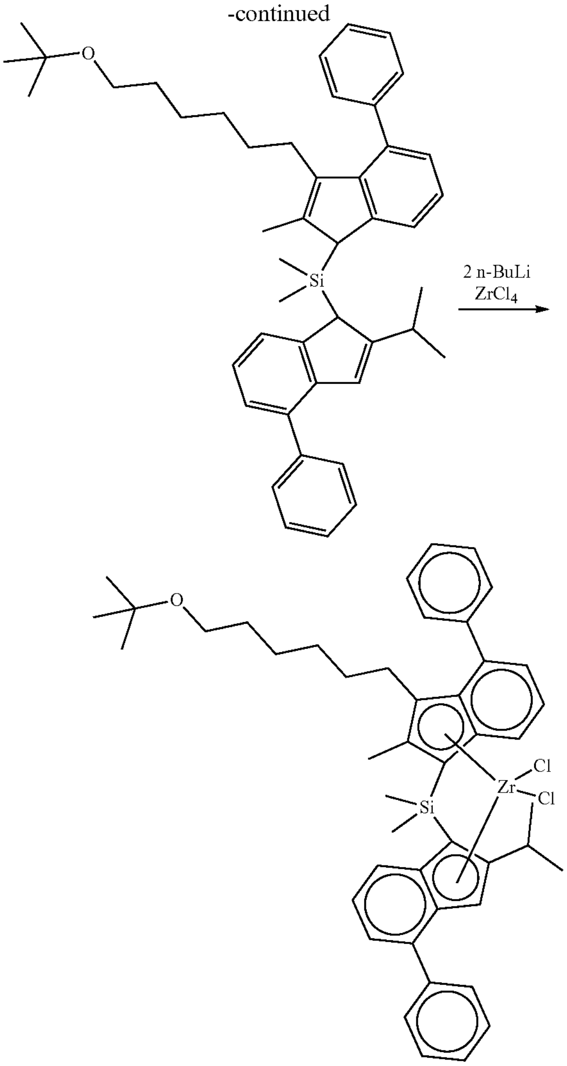

Preparation of (3-(6-(tert-butoxy)hexyl)-2-methyl-4-phenyl-1H-inden-1-yl)(2-isopropyl-4-phenyl-1H-inden-1-yl)dimethylsilane 2-iPr-4-PhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-Me-4-PhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, tert-ButoxyHexyl-Iodide (1.05 eq) was dissolved in THF (0.6 M) and added thereto at −25° C. Then, it was stirred overnight at room temperature, worked-up with water, and then dried to obtain a ligand.

Preparation of di methyl-silanediyl(3-(6-(tert-butoxy)hexyl)-2-methyl-4-phenyl-1H-inden-1-yl)(2-isopropyl-4-phenyl-1H-inden-1-yl) Zirconium dichloride The ligand was dissolved in a mixed solvent of toluene: ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

$^1$H-NMR (500 MHz, $CDCl_3$): 8.26 (d, 2H), 7.38-7.52 (m, 14H), 6.35 (s, 1H), 3.51 (t, 2H), 2.38 (m, 1H), 2.12 (s, 3H), 1.92 (m, 2H), 1.40-1.50 (m, 8H), 0.91 (d, 6H), 0.86 (s, 6H)

Example 3

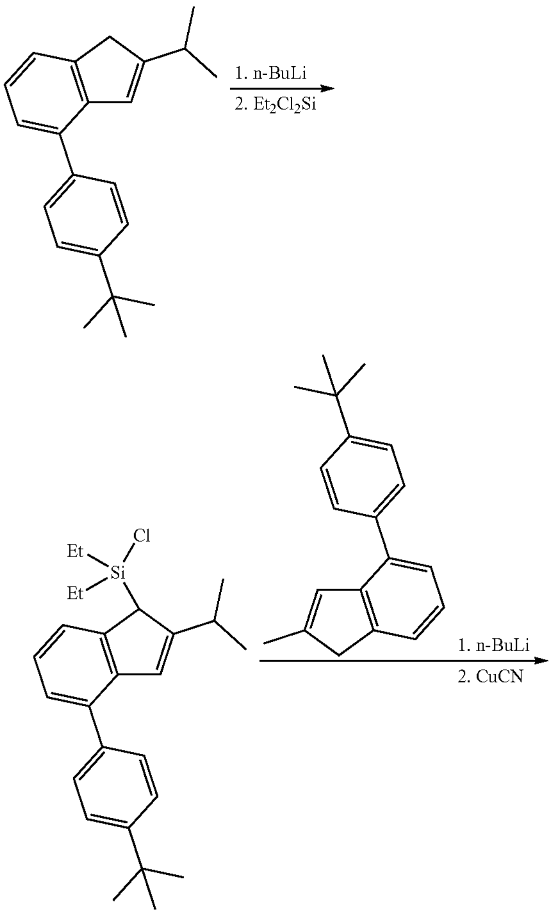

-continued

-continued

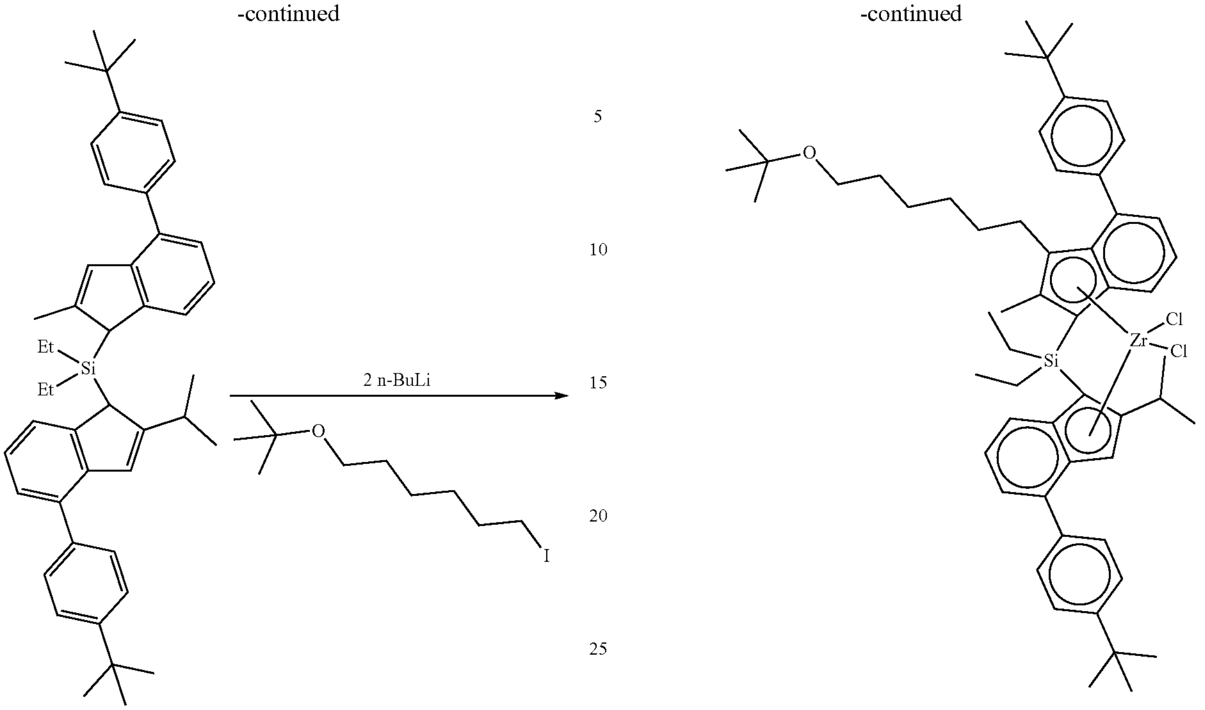

Preparation of (3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl)diethylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, tert-ButoxyHexyl-Iodide (1.05 eq) was dissolved in THF (0.6 M) and added thereto at −25° C. Then, it was stirred overnight at room temperature, worked-up with water, and then dried to obtain a ligand.

Preparation of diethyl-silanediyl(3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl) Zirconium dichloride The ligand was dissolved in a mixed solvent of toluene:ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

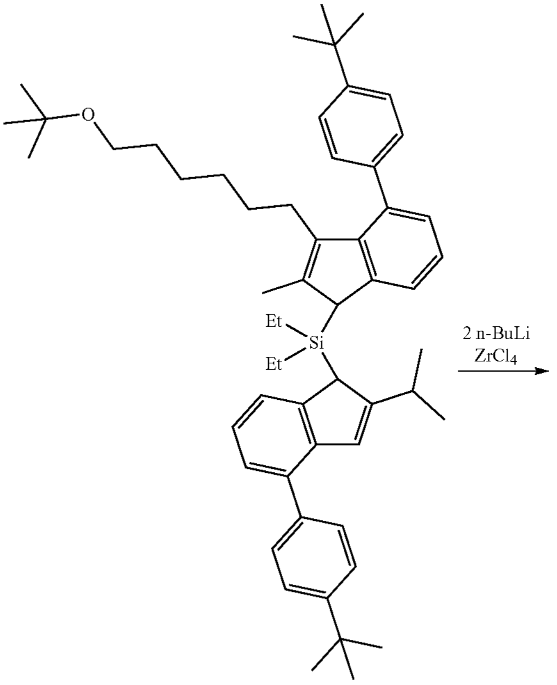

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

$^{1}$H-NMR (500 MHz, $CDCl_3$): 8.29 (d, 2H), 7.29-7.40 (m, 12H), 6.36 (s, 1H), 3.50 (t, 2H), 2.38 (m, 1H), 2.11 (s, 3H), 1.92 (m, 2H), 1.40-1.50 (m, 8H), 1.31 (s, 18H), 0.91 (d, 6H), 0.86 (t, 6H), 0.74 (m, 4H)

Example 4

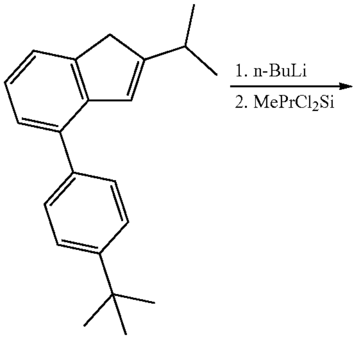

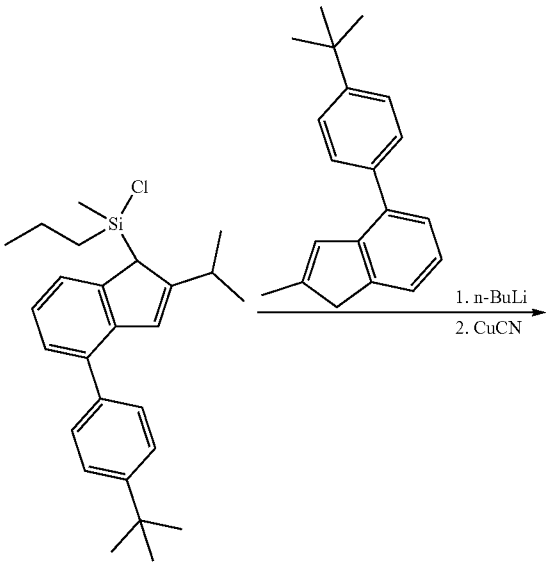

-continued

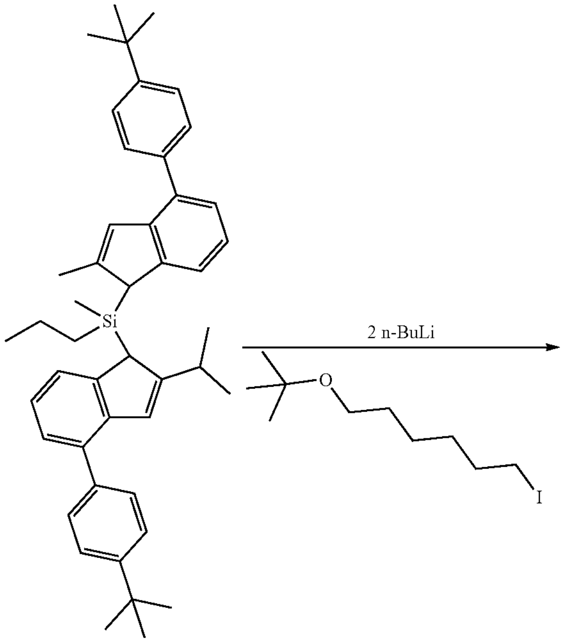

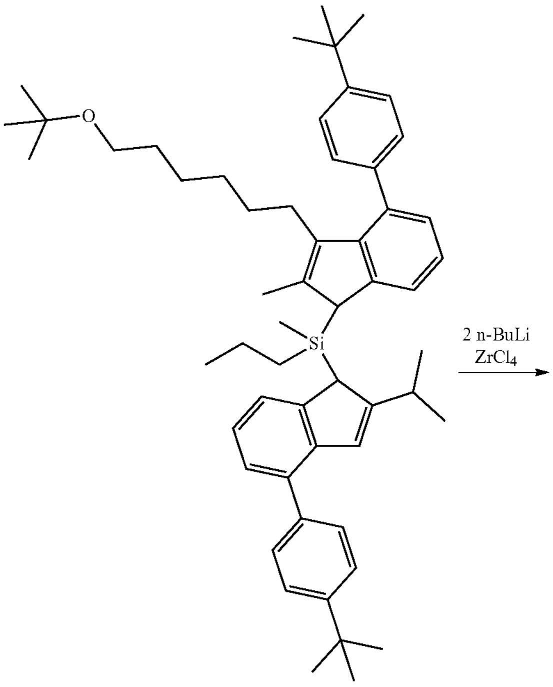

-continued

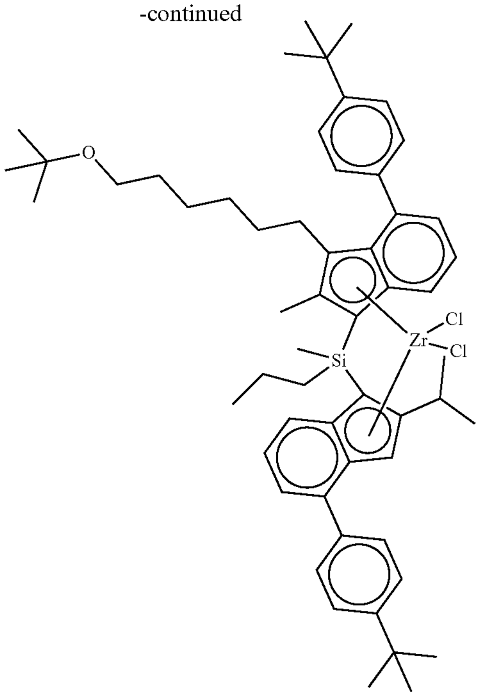

Preparation of (3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl)methylpropylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro methylpropyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, tert-ButoxyHexyl-Iodide (1.05 eq) was dissolved in THF (0.6 M) and added thereto at −25° C. Then, it was stirred overnight at room temperature, worked-up with water, and then dried to obtain a ligand.

Preparation of methylpropyl-silanediyl(3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl) Zirconium dichloride The ligand was dissolved in a mixed solvent of toluene:ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

$^1$H-NMR (500 MHz, $CDCl_3$): 8.30 (d, 2H), 7.30-7.41 (m, 12H), 6.37 (s, 1H), 3.52 (t, 2H), 2.39 (m, 1H), 2.12 (s, 3H), 1.93 (m, 2H), 1.42-1.52 (m, 8H), 1.31 (m, 20H), 0.98 (t, 3H), 0.86 (d, 6H), 0.72-0.81 (m, 5H)

Example 5

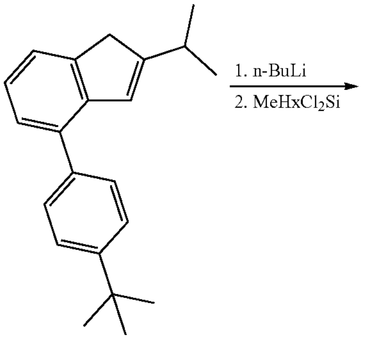

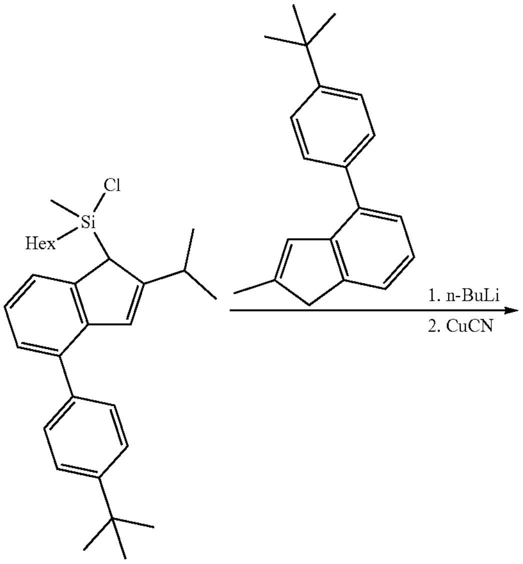

-continued

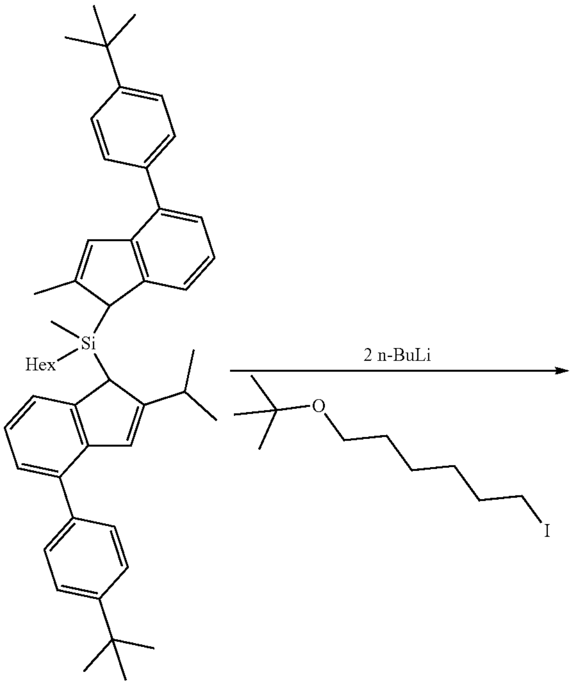

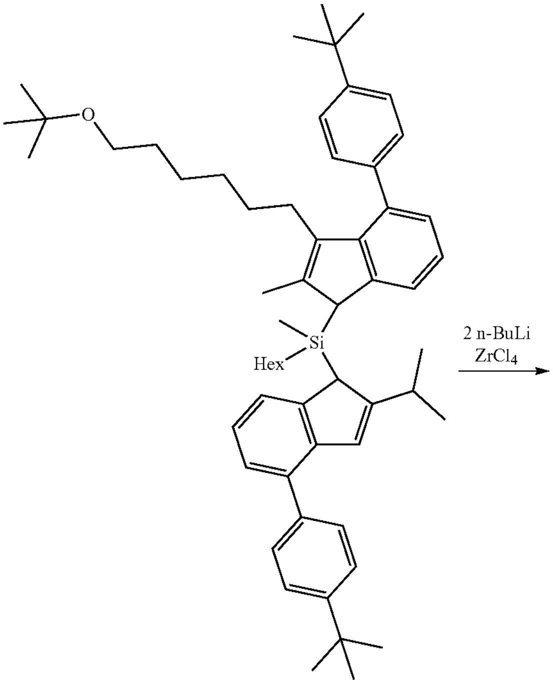

-continued

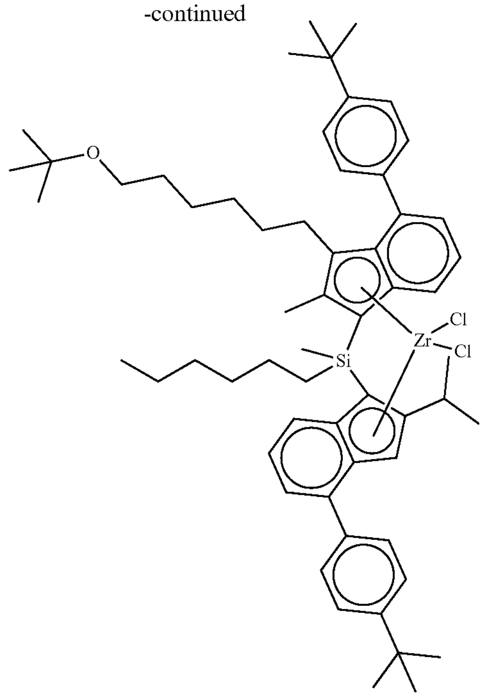

Preparation of (3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl)methylhexylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro methylhexyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, tert-ButoxyHexyl-Iodide (1.05 eq) was dissolved in THF (0.6 M) and added thereto at −25° C. Then, it was stirred overnight at room temperature, worked-up with water, and then dried to obtain a ligand.

Preparation of methylhexyl-silanediyl(3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl) Zirconium dichloride The ligand was dissolved in a mixed solvent of toluene: ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

$^1$H-NMR (500 MHz, $CDCl_3$): 8.29 (d, 2H), 7.30-7.38 (m, 12H), 6.35 (s, 1H), 3.50 (t, 2H), 2.40 (m, 1H), 2.12 (s, 3H), 1.92 (m, 2H), 1.32-1.52 (m, 16H), 1.30 (s, 18H), 1.09 (t, 3H), 0.85 (d, 6H), 0.68-0.81 (m, 5H)

Example 6

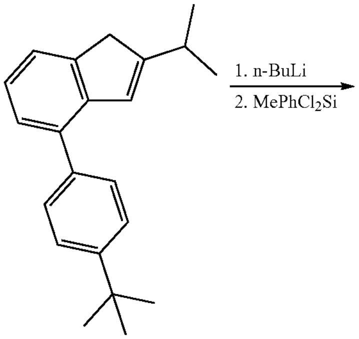

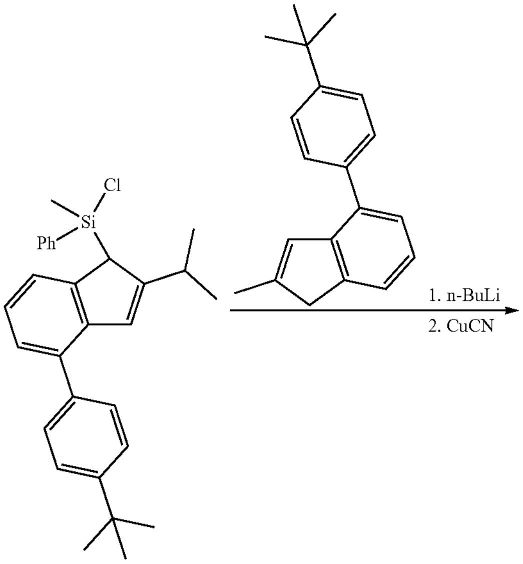

-continued

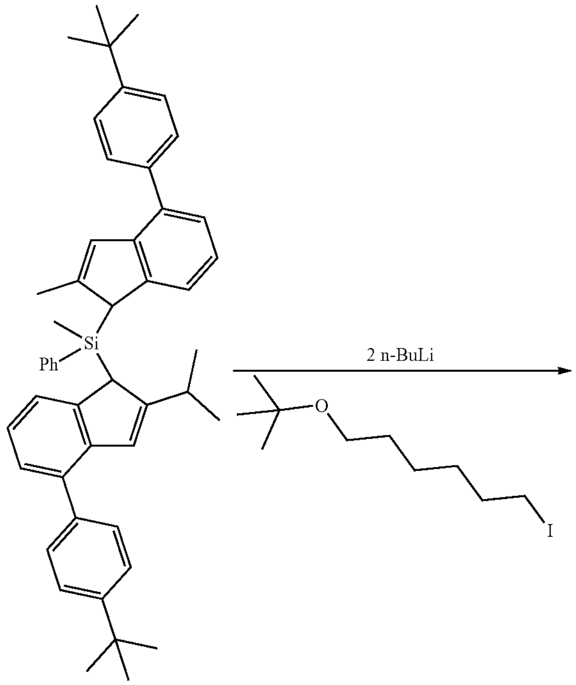

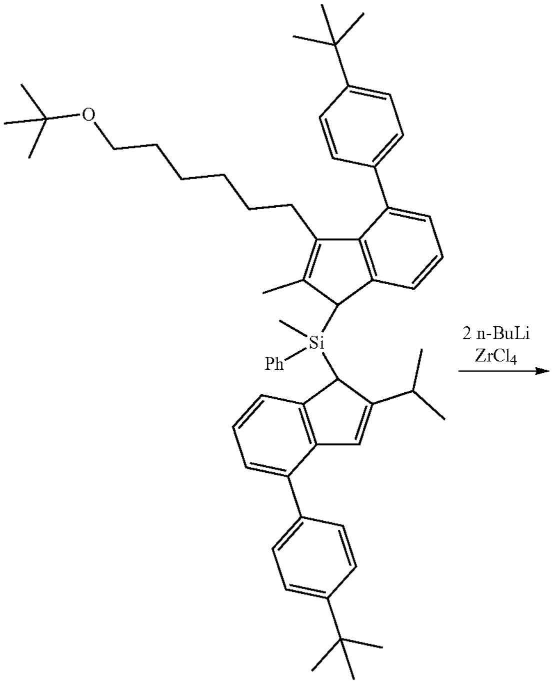

-continued

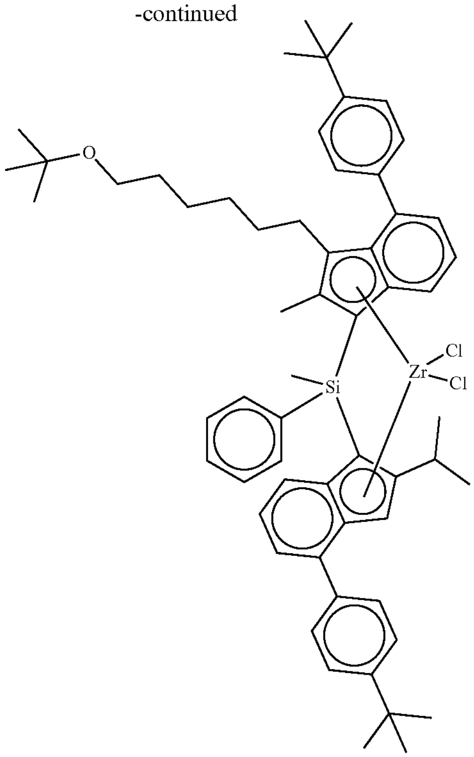

Preparation of (3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl)methylphenylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro methylphenyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, tert-ButoxyHexyl-Iodide (1.05 eq) was dissolved in THF (0.6 M) and added thereto at −25° C. Then, it was stirred overnight at room temperature, worked-up with water, and then dried to obtain a ligand.

Preparation of methylphenyl-silanediyl(3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl) Zirconium dichloride The ligand was dissolved in a mixed solvent of toluene: ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

$^1$H-NMR (500 MHz, $CDCl_3$): 8.28 (m, 2H), 7.38-7.52 (m, 19H), 6.34 (s, 1H), 3.50 (t, 2H), 2.39 (m, 1H), 2.12, 2.13, 2.16 (s, 3H), 1.92 (m, 2H), 1.40-1.50 (m, 8H), 0.91, 0.92, 0.94 (d, 6H), 0.86 (s, 3H)

Example 7

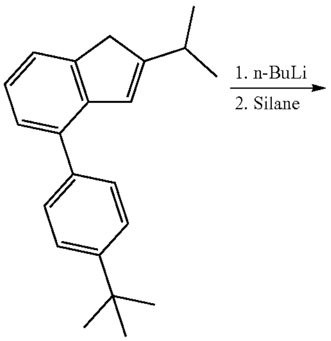

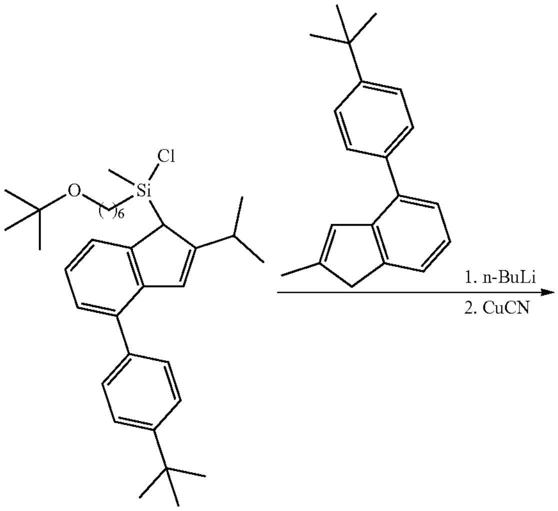

-continued

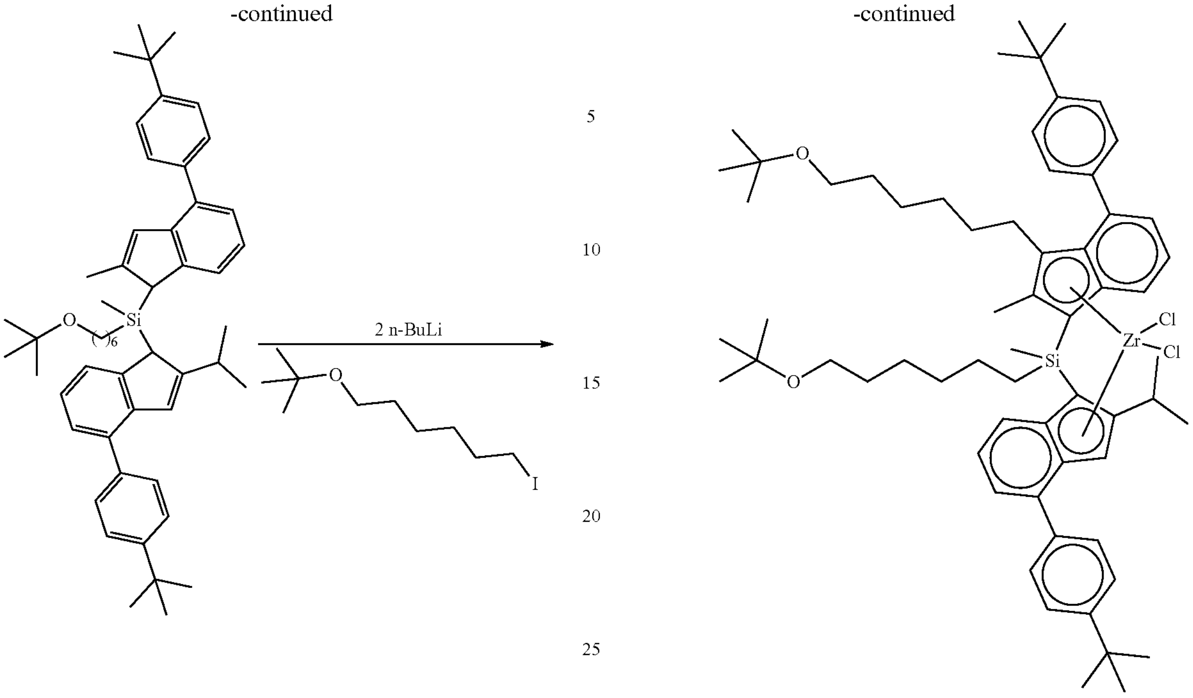

-continued

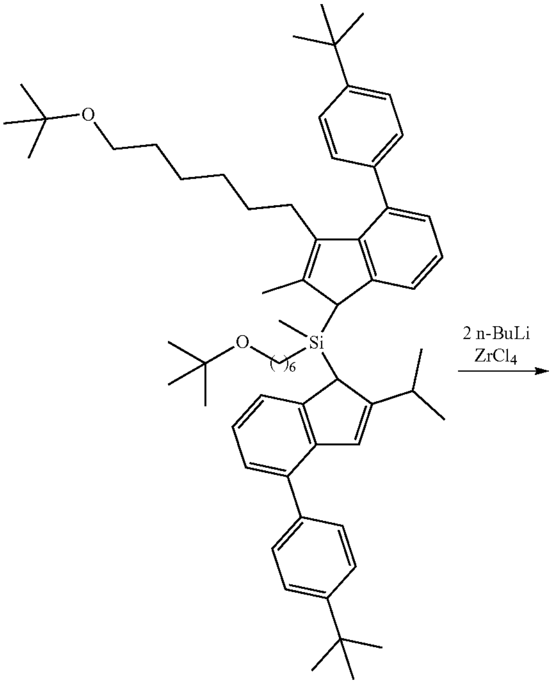

Preparation of (3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl)methyl(6-(tert-butoxy)hexyl)silane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro methyl(6-(tert-butoxy)hexyl) silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, tert-ButoxyHexyl-Iodide (1.05 eq) was dissolved in THF (0.6 M) and added thereto at −25° C. Then, it was stirred overnight at room temperature, worked-up with water, and then dried to obtain a ligand.

Preparation of methyl(6-(tert-butoxy)hexyl)-silanediyl(3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl) Zirconium dichloride The ligand was dissolved in a mixed solvent of toluene:ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

$^1$H-NMR (500 MHz, $CDCl_3$): 8.31 (d, 2H), 7.30-7.39 (m, 12H), 6.37 (s, 1H), 3.52 (t, 4H), 2.38 (m, 1H), 2.11 (s, 3H), 1.92 (m, 4H), 1.41-1.52 (m, 16H), 1.31 (s, 18H), 0.92 (d, 6H), 0.81 (s, 3H)

Example 8

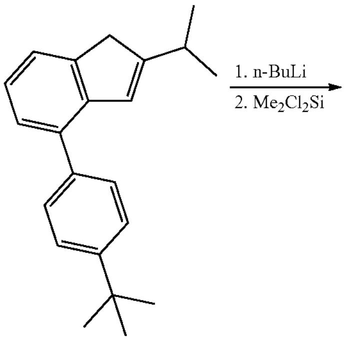

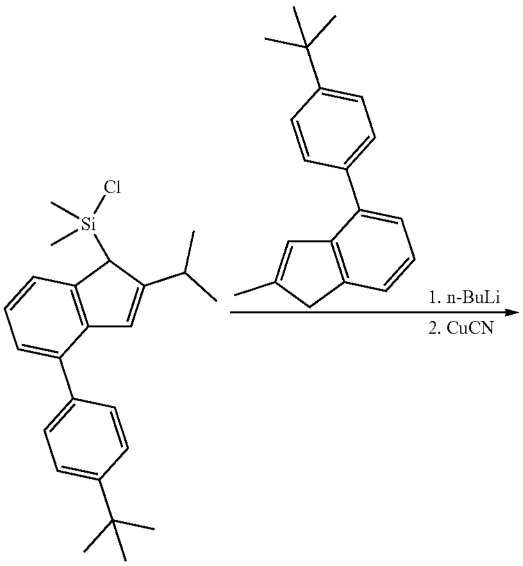

-continued

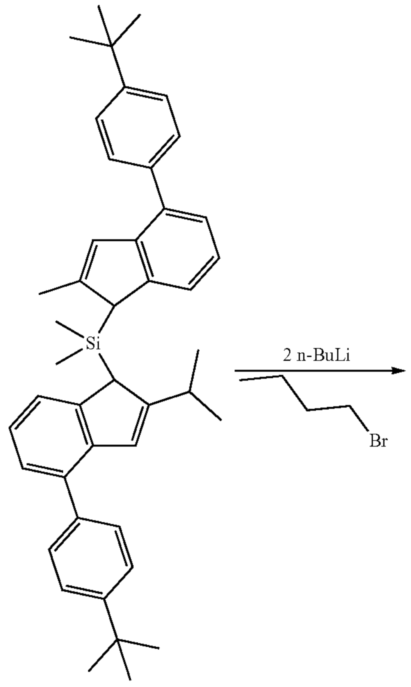

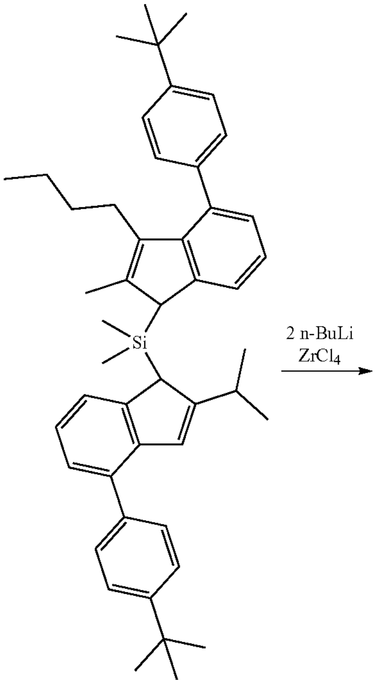

-continued

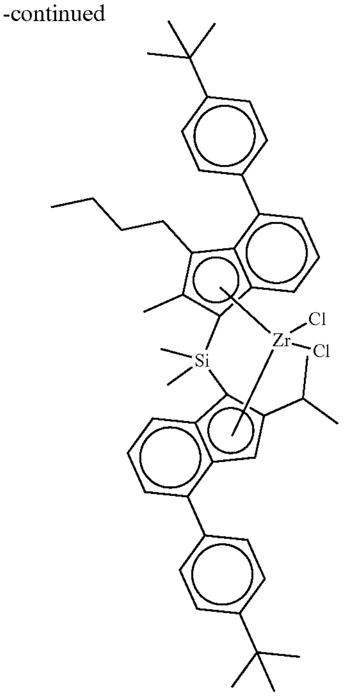

Preparation of (3-buthyl-4-(4-(tert-butyl)phenyl)-2-methyl-1H-inden-1-yl)(4-(4-(tert-butyl)phenyl)-2-isopropyl-1H-inden-1-yl)dimethylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, butylbromide (1.05 eq) was dissolved in THF (0.6 M) and added thereto at −25° C. Then, it was stirred overnight at room temperature, worked-up with water, and then dried to obtain a ligand.

Preparation of dimethyl-silanediyl(3-buthyl-4-(4-(tert-butyl)phenyl)-2-methyl-1H-inden-1-yl)(4-(4-(tert-butypphenyl)-2-isopropyl-1H-inden-1-yl) Zirconium dichloride The ligand was dissolved in a mixed solvent of toluene: ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

$^1$H-NMR (500 MHz, $CDCl_3$): 8.29 (d, 2H), 7.28-7.37 (m, 12H), 6.35 (s, 1H), 2.38 (m, 1H), 2.08 (s, 3H), 1.92 (m, 2H), 1.28-1.34 (m, 22H), 0.99 (m, 9H), 0.86 (s, 6H)

Example 9

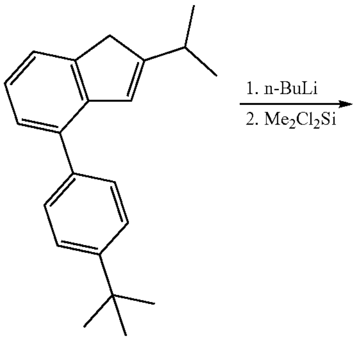

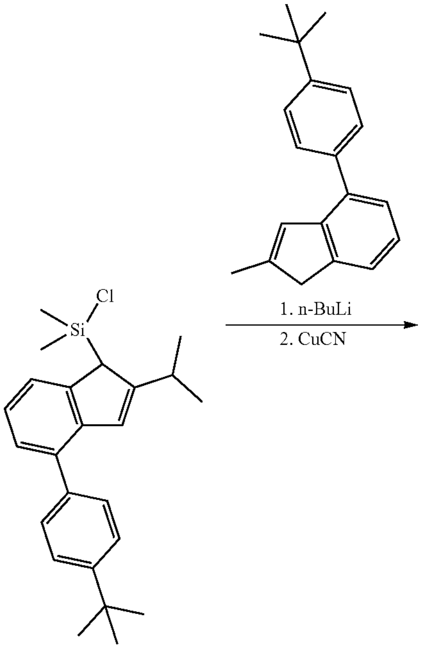

-continued

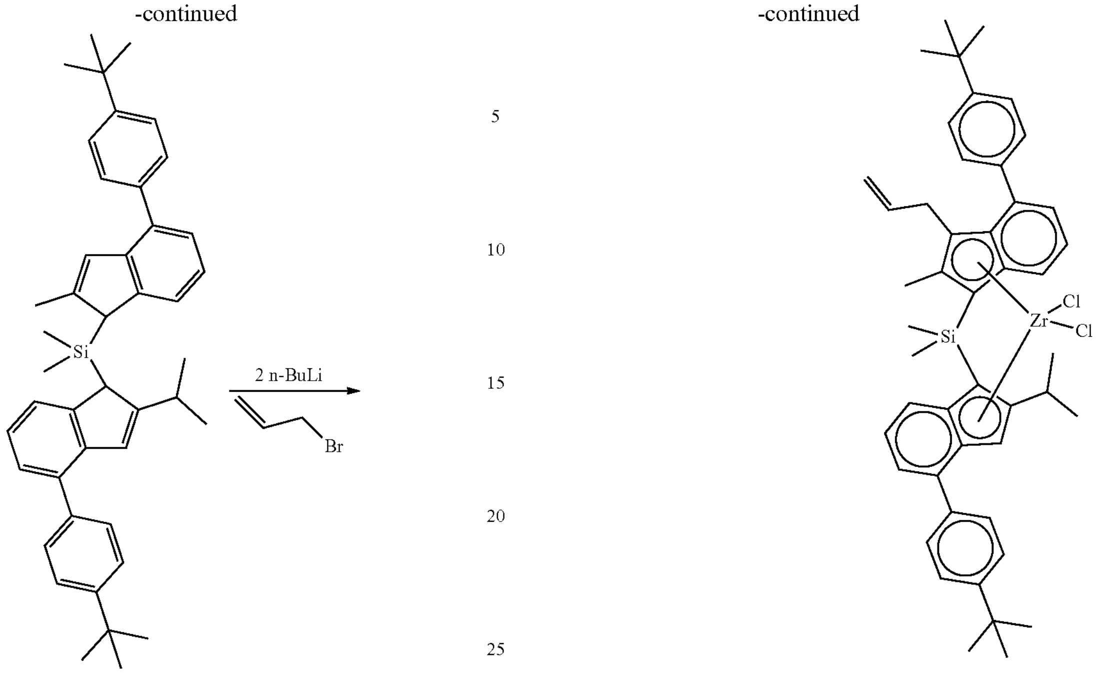

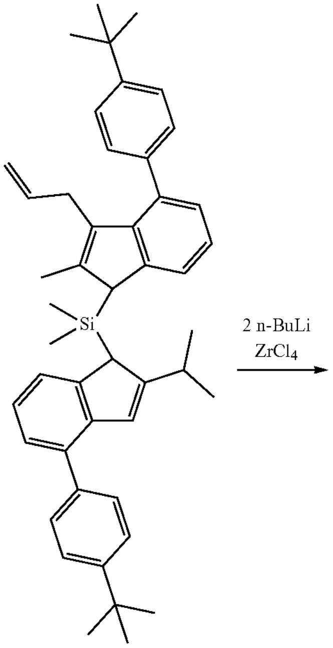

Preparation of (3-(1-propene)-4-(4-(tert-butyl)phenyl)-2-methyl-1H-inden-1-yl)(4-(4-(tert-butyl)phenyl)-2-isopropyl-1H-inden-1-yl)dimethylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, 3-bromoprop-1-ene (1.05 eq) was dissolved in THF (0.6 M) and added thereto at −25° C. Then, it was stirred overnight at room temperature, worked-up with water, and then dried to obtain a ligand.

Preparation of dimethyl-silanediyl(3-(1-propene)-4-(4-(tert-butyl)phenyl)-2-methyl-1H-inden-1-yl)(4-(4-(tert-butypphenyl)-2-isopropyl-1H-inden-1-yl) Zirconium dichloride The ligand was dissolved in a mixed solvent of toluene: ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.
$^1$H-NMR (500 MHz, $CDCl_3$): 8.28 (d, 2H), 7.29-7.39 (m, 12H), 6.33 (s, 1H), 5.98 (m, 1H), 5.50-5.52 (m, 2H), 2.62 (d, 2H), 2.38 (m, 1H), 2.10 (s, 3H), 1.91 (m, 2H), 1.28 (s, 18H), 0.99 (d, 6H), 0.85 (s, 6H)
Example 10
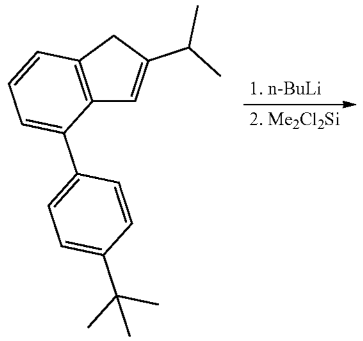
-continued
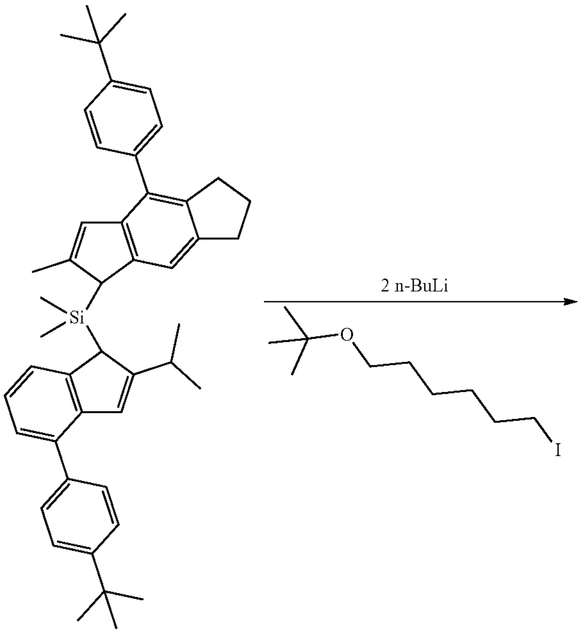
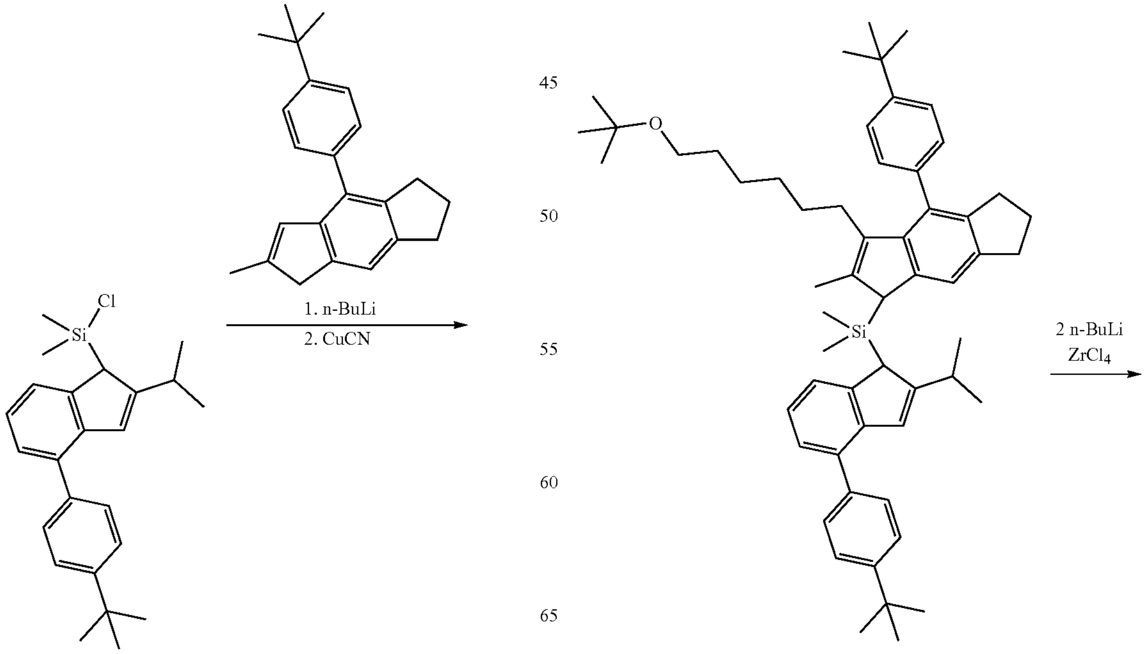

-continued

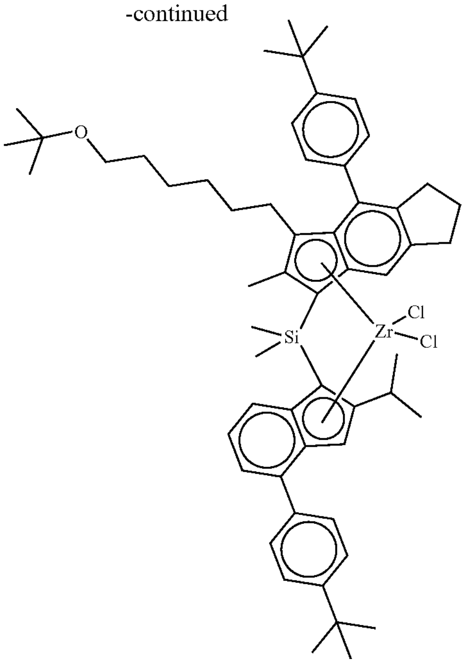

Preparation of (3-(6-(tert-butoxy)hexyl)-4-(4-(tert-butyl)phenyl)-2-methyl-1,5,6,7-tetrahydro-s-indacen-1-yl)(4-(4-(tert-butyl)phenyl)-2-isopropyl-1H-inden-1-yl)dimethylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 4-(tert-butyl)phenyl)-2-methyl-1,5,6,7-tetrahydro-s-indacene (1 eq) was dissolved in a mixed solvent of toluene: THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, tert-ButoxyHexyl-Iodide (1.05 eq) was dissolved in THF (0.6 M) and added thereto at −25° C. Then, it was stirred overnight at room temperature, worked-up with water, and then dried to obtain a ligand.

Preparation of dimethyl-silanediyl(3-(6-(tert-butoxy)hexyl)-4-(4-(tert-butyl)phenyl)-2-methyl-1,5,6,7-tetrahydro-s-indacen-1-yl)(4-(4-(tert-butyl)phenyl)-2-isopropyl-1H-inden-1-yl) Zirconium dichloride The ligand was dissolved in a mixed solvent of toluene: ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

$^1$H-NMR (500 MHz, $CDCl_3$): 8.29 (d, 1H), 7.31-7.39 (m, 11H), 6.36 (s, 1H), 3.52 (t, 2H), 2.38-2.44 (m, 5H), 2.12 (s, 3H), 1.92-1.95 (m, 4H), 1.40-1.50 (m, 8H), 1.31 (s, 18H), 0.91 (d, 6H), 0.86 (s, 6H)

Example 11

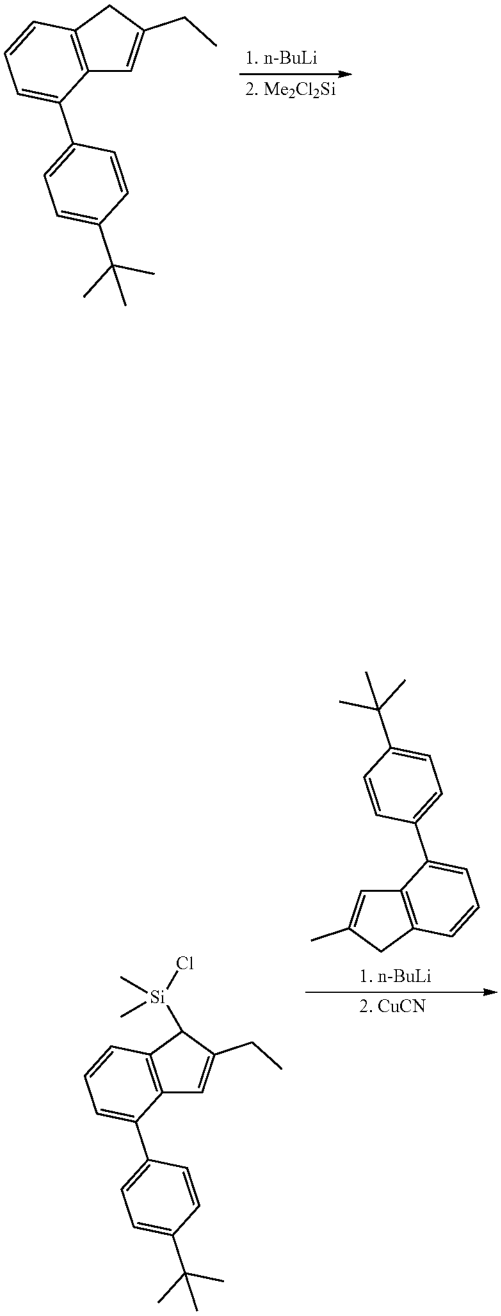

-continued

-continued

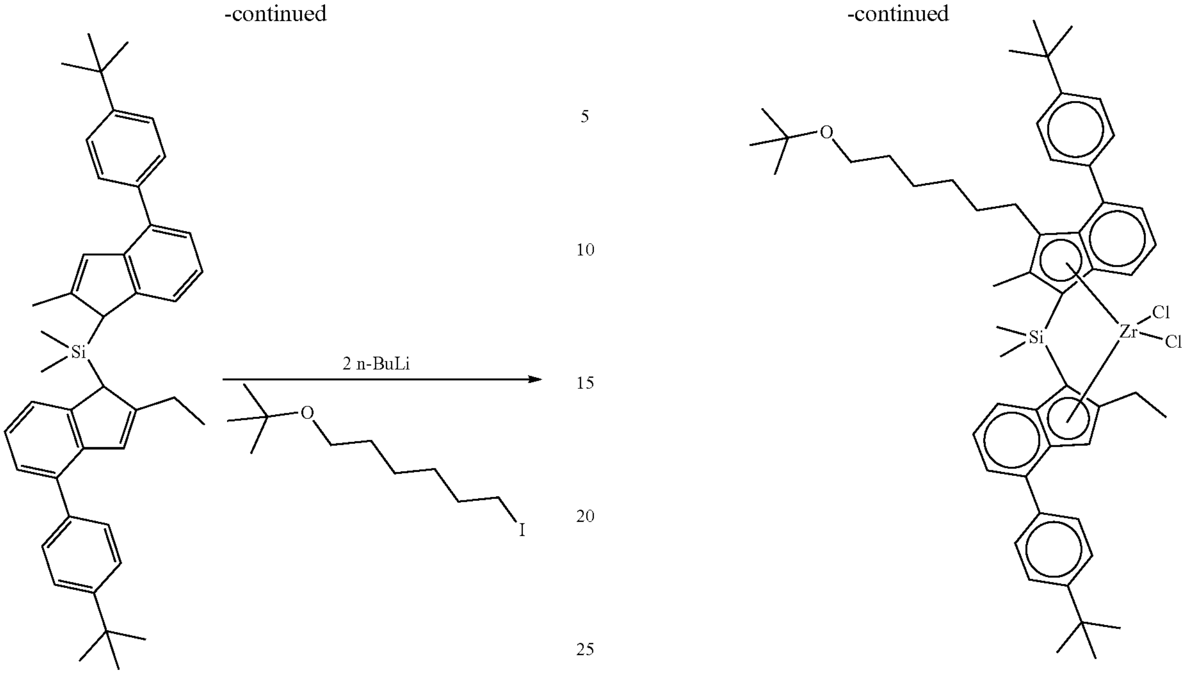

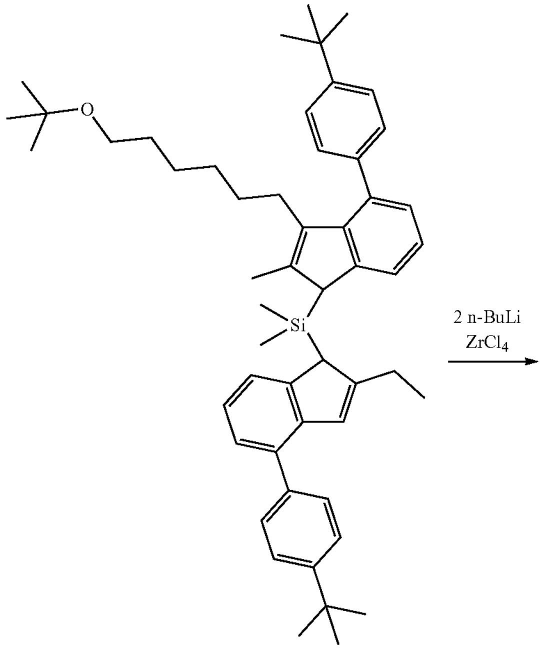

Preparation of (3-(6-(tert-butoxy)hexyl)-4-(4-(tert-butyl)phenyl)-2-methyl-1H-inden-1-yl)(4-(4-(tert-butyl)phenyl)-2-ethyl-1H-inden-1-yl)dimethylsilane 2-Et-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, tert-ButoxyHexyl-Iodide (1.05 eq) was dissolved in THF (0.6 M) and added thereto at −25° C. Then, it was stirred overnight at room temperature, worked-up with water, and then dried to obtain a ligand.

Preparation of dimethyl-silanediyl(3-(6-(tert-butoxy)hexyl)-4-(4-(tert-butyl)phenyl)-2-methyl-1H-inden-1-yl)(4-(4-(tert-butyl)phenyl)-2-ethyl-1H-inden-1-yl) Zirconium dichloride The ligand was dissolved in a mixed solvent of toluene:ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.
$^1$H-NMR (500 MHz, $CDCl_3$): 8.31 (d, 2H), 7.30-7.39 (m, 12H), 6.37 (s, 1H), 3.51 (t, 2H), 2.21 (m, 2H), 2.12 (s, 3H), 1.92 (m, 2H), 1.40-1.50 (m, 8H), 1.31 (s, 18H), 0.98 (t, 3H), 0.86 (s, 6H)
Example 12
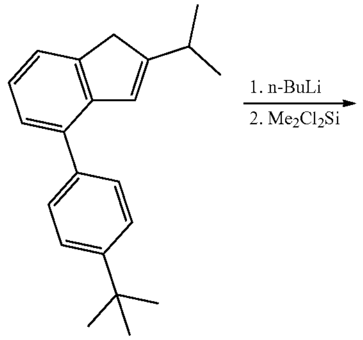
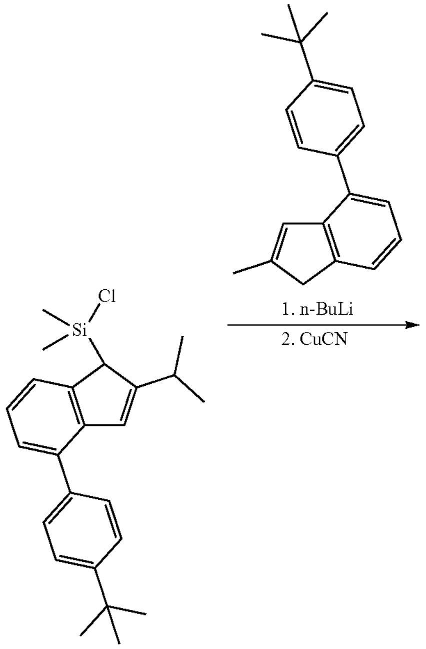
-continued
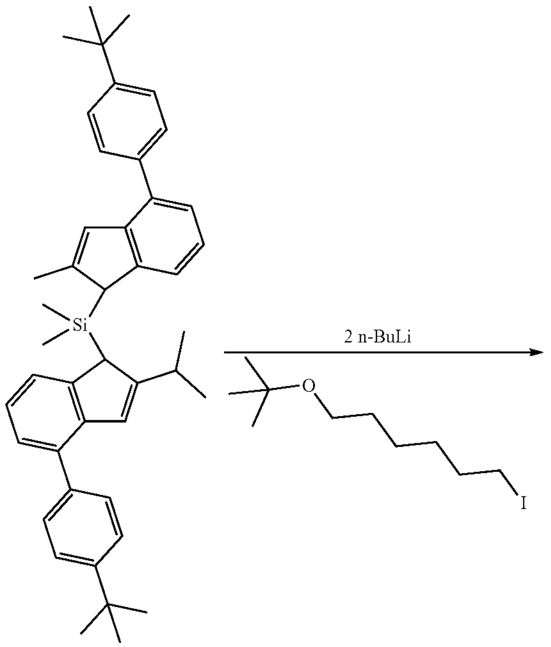
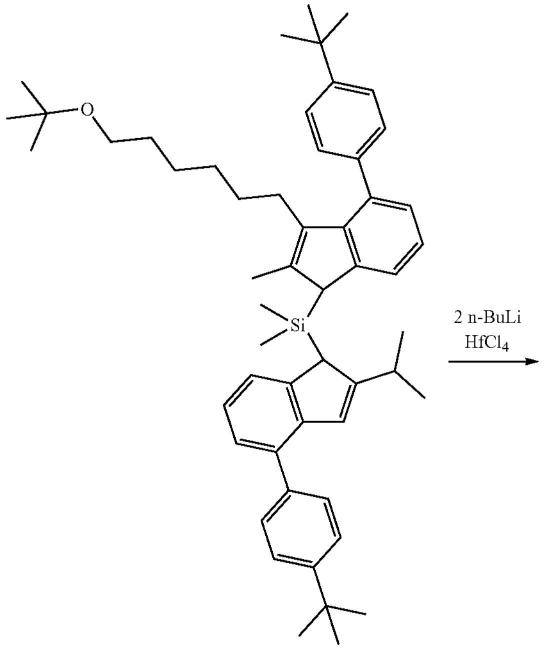

-continued

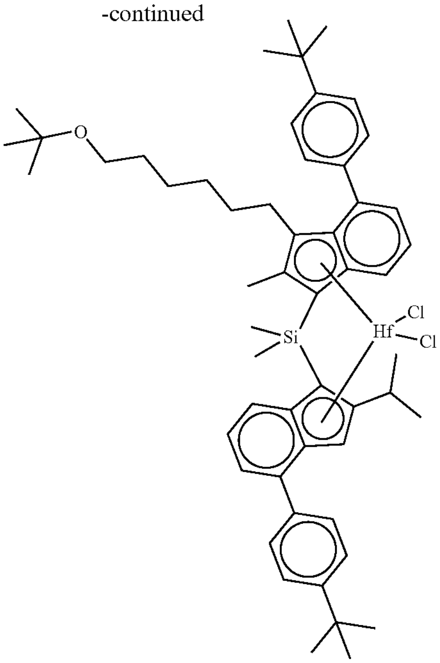

Preparation of (3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl)dimethylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, tert-ButoxyHexyl-Iodide (1.05 eq) was dissolved in THF (0.6 M) and added thereto at −25° C. Then, it was stirred overnight at room temperature, worked-up with water, and then dried to obtain a ligand.

Preparation of dimethyl-silanediyl(3-(6-(tert-butoxy)hexyl)-4-(4-(tert-butyl)phenyl)-2-methyl-1H-inden-1-yl)(4-(4-(tert-butyl)phenyl)-2-isopropyl-1H-inden-1-yl) Hafnium dichloride The ligand was dissolved in a mixed solvent of toluene:ether (2:1, 0.53 M), and n-BuLi (2.05 eq) was added at −25° C., followed by stirring at room temperature for 5 hours. A slurry was prepared by mixing $HfCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

$^{1}H$-NMR (500 MHz, $CDCl_3$): 8.32 (d, 2H), 7.31-7.40 (m, 12H), 6.25 (s, 1H), 3.52 (t, 2H), 2.41 (m, 1H), 2.21 (s, 3H), 1.92 (m, 2H), 1.40-1.50 (m, 8H), 1.31 (s, 18H), 1.11 (d, 6H), 0.86 (s, 6H)

Example 13

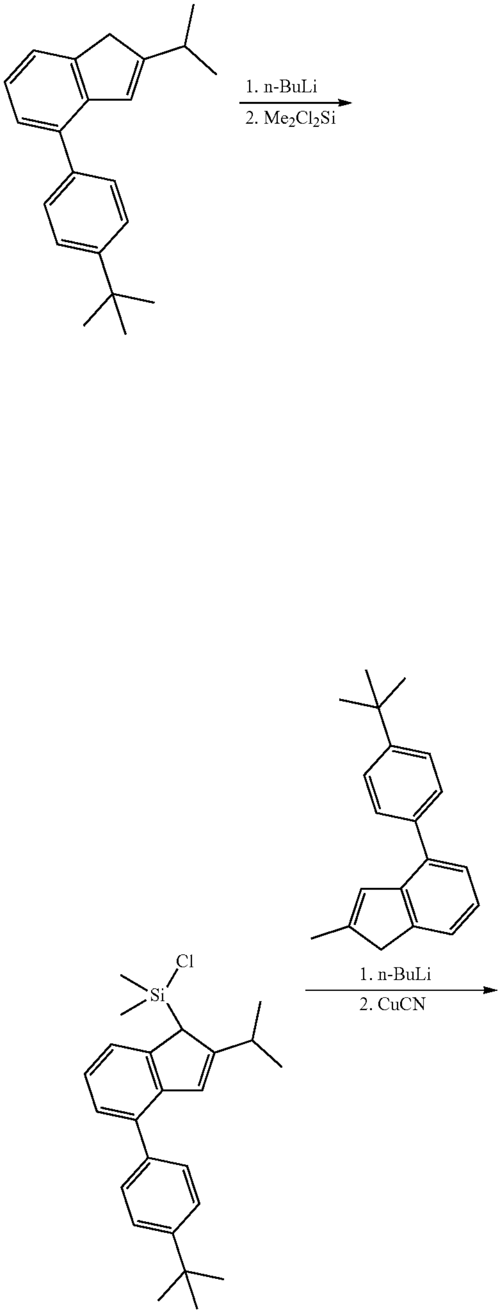

-continued

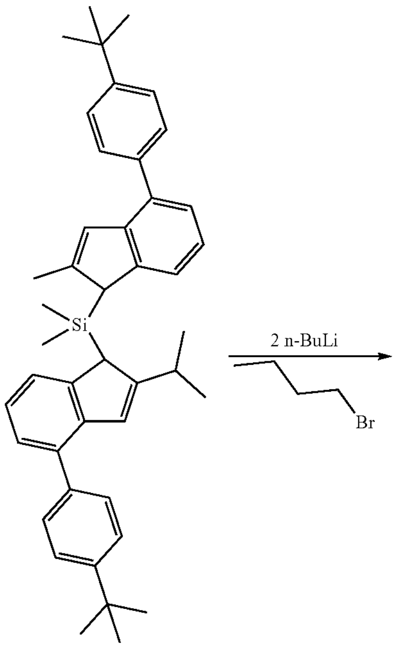

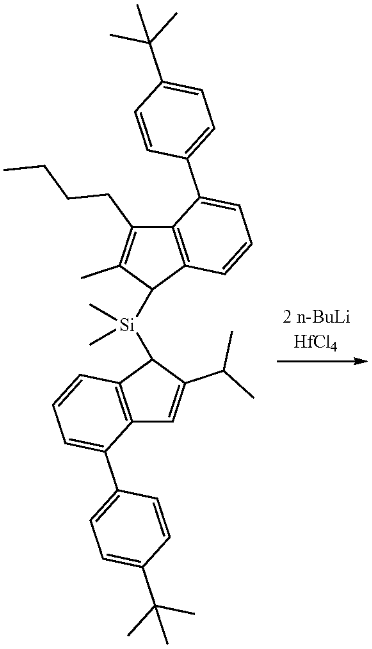

-continued

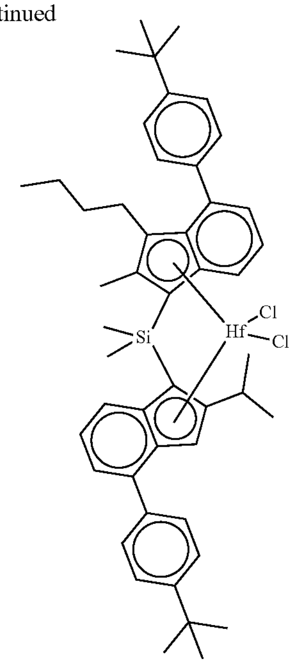

Preparation of (3-buthyl-4-(4-(tert-butyl)phenyl)-2-methyl-1H-inden-1-yl)(4-(4-(tert-butyl)phenyl)-2-isopropyl-1H-inden-1-yl)dimethylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, butylbromide (1.05 eq) was dissolved in THF (0.6 M) and added thereto at −25° C. Then, it was stirred overnight at room temperature, worked-up with water, and then dried to obtain a ligand.

Preparation of dimethyl-silanediyl(3-buthyl-4-(4-(tert-butyl)phenyl)-2-methyl-1H-inden-1-yl)(4-(4-(tert-butypphenyl)-2-isopropyl-1H-inden-1-yl) Hafnium dichloride The ligand was dissolved in a mixed solvent of toluene: ether (2:1, 0.53 M), and n-BuLi (2.05 eq) was added at −25° C., followed by stirring at room temperature for 5 hours. A slurry was prepared by mixing $HfCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

$^1$H-NMR (500 MHz, $CDCl_3$): 8.33 (d, 2H), 7.30-7.38 (m, 12H), 6.21 (s, 1H), 2.40 (m, 1H), 2.21 (s, 3H), 1.92 (m, 2H), 1.28-1.34 (m, 22H), 0.99-1.10 (m, 9H), 0.86 (s, 6H)

Comparative Example 1

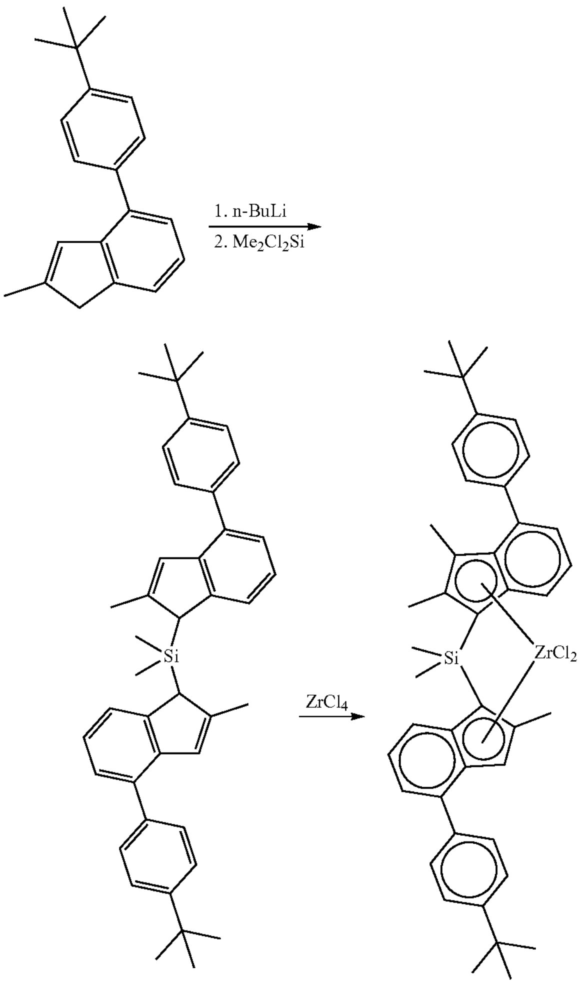

Preparation of bis(2-Methyl-4-(4'-tertbutylphenyl) Inden-1yl) silane

2-Methyl-4-(4'-tertbutylphenyl)Indene (1 eq) was dissolved in a mixed solvent of toluene:THF (10:1, 0.3 M), and n-BuLi (2.1 eq) was slowly added dropwise thereto at −25° C., followed by stirring at room temperature for 3 hours. Thereafter, CuCN (2 mol %) was added and stirred for 30 minutes, and then dichloro dimethyl silane (0.53 eq) was added thereto at −10° C., followed by stirring overnight at room temperature. Then, it was stirred overnight at room temperature, worked-up with water, and then dried to obtain a ligand.

Preparation of dimethylsilanediylbis(2-Methyl-4-(4'-tertbutylphenyl)Inden-1yl) zirconium dichloride The ligand prepared above was dissolved in a mixed solvent of Toluene:Ether (10:1 by volume, 0.1 M), and n-BuLi (2.05 eq) was added at −25° C., followed by stirring at room temperature for 5 hours. A slurry was prepared by mixing $ZrCl_4$ (1 eq) with toluene (0.17 M) in a separate flask, and added to the ligand solution, followed by stirring overnight at room temperature. When the reaction was completed, the solvent was vacuum-dried, and dichloromethane was added again. Then, LiCl was removed through a filter, and the filtrate was vacuum-dried. Subsequently, after recrystallization using dichloromethane/hexane, the resulting solid was filtered and vacuum-dried to obtain a solid transition metal compound.

Comparative Example 2

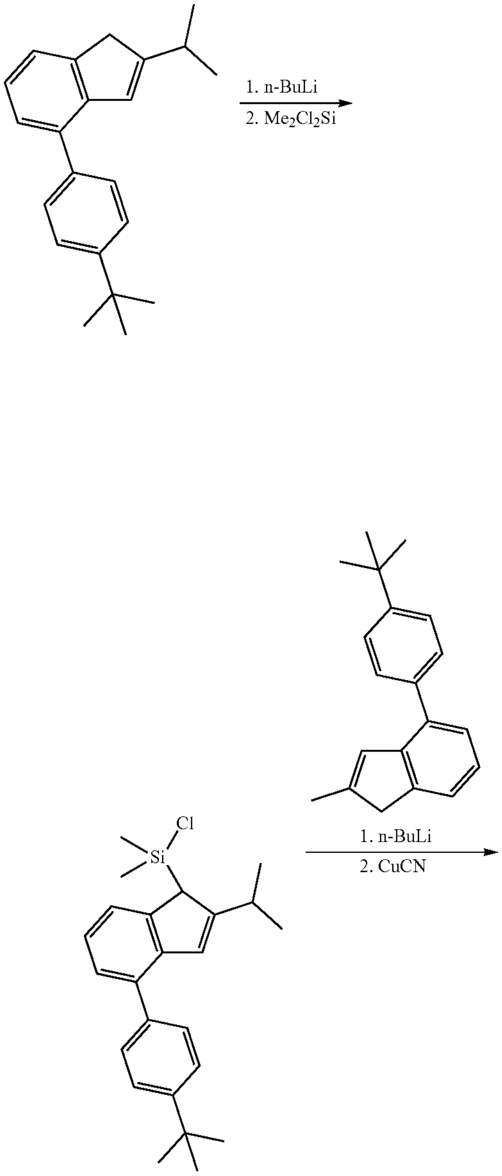

-continued

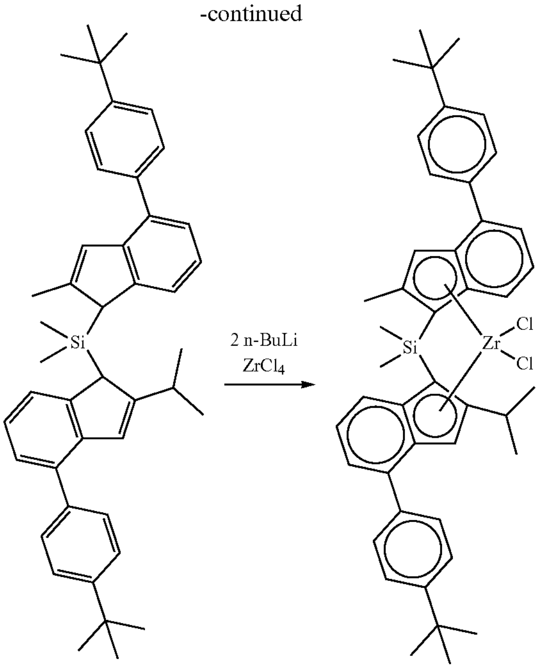

Preparation of (4-(4-(tert-butyl)phenyl)-2-methyl-1H-inden-1-yl)(4-(4-(tert-butyl)phenyl)-2-isopropyl-1H-inden-1-yl)dimethylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried to obtain a ligand.

Preparation of dimethyl-silanediyl(4-(4-(tert-butyl)phenyl)-2-methyl-1H-inden-1-yl)(4-(4-(tert-butyl)phenyl)-2-isopropyl-1H-inden-1-yl) Zirconium dichloride The ligand was dissolved in a mixed solvent of toluene:ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

Comparative Example 3

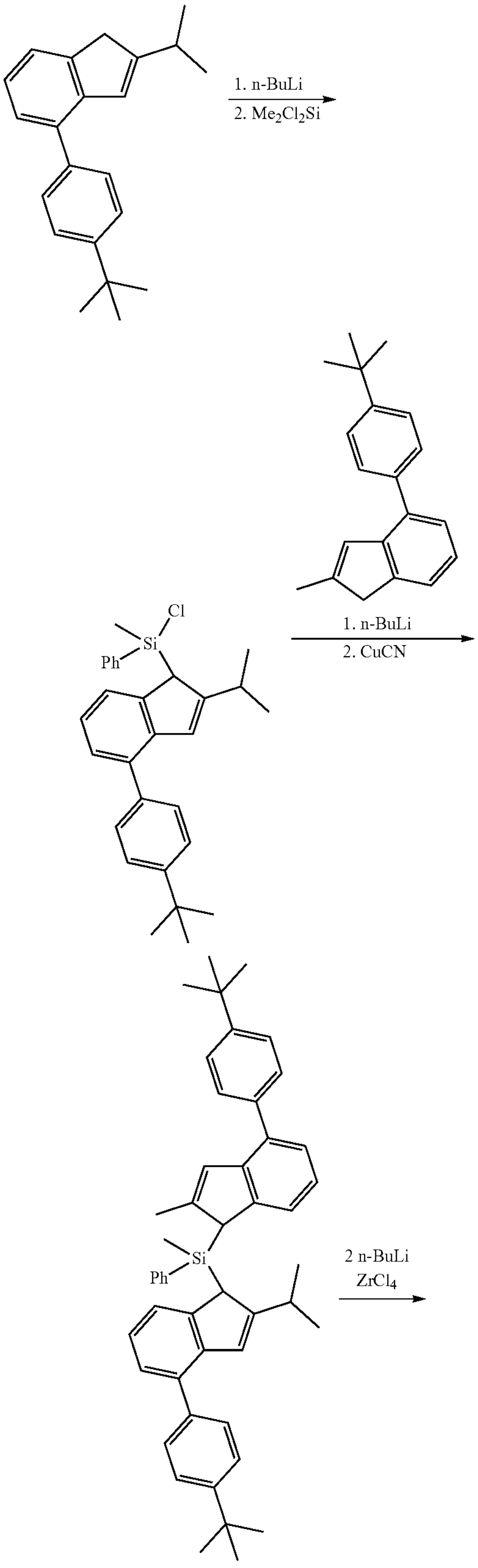

-continued

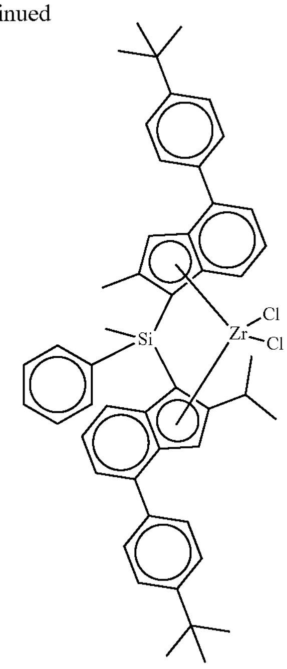

Preparation of (4-(4-(tert-butyl)phenyl)-2-methyl-1H-inden-1-yl)(4-(4-(tert-butyl)phenyl)-2-isopropyl-1H-inden-1-yl)methylphenylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro methyl phenyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried to obtain a ligand.

Preparation of methylphenyl-silanediyl(4-(4-(tert-butyl)phenyl)-2-methyl-1H-inden-1-yl)(4-(4-(tert-butyl)phenyl)-2-isopropyl-1H-inden-1-yl) Zirconium dichloride The ligand was dissolved in a mixed solvent of toluene: ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

Comparative Example 4

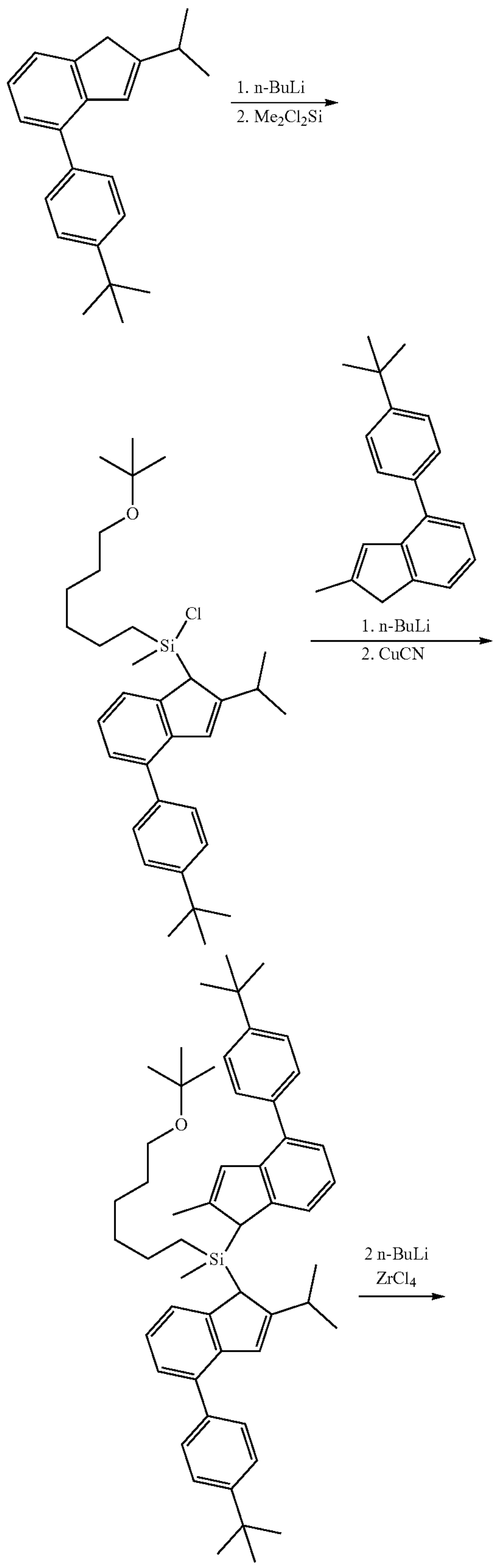

-continued

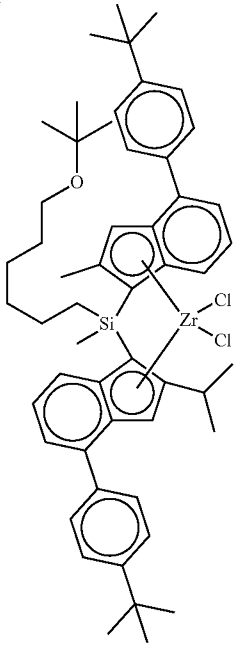

Preparation of (4-(4-(tert-butyl)phenyl)-2-methyl-1H-inden-1-yl)(4-(4-(tert-butyl)phenyl)-2-isopropyl-1H-inden-1-yl)(6-(tert-butoxy)hexylmethylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro (6-(tert-butoxy)hexylmethyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried to obtain a ligand.

Preparation of (6-(tert-Butoxy)hexylmethylmethylsilanediyl(4-(4-(tert-butyl)phenyl)-2-methyl-1H-inden-1-yl)(4-(4-(tert-butyl)phenyl)-2-isopropyl-1H-inden-1-yl) Zirconium dichloride The ligand was dissolved in a mixed solvent of toluene: ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

Comparative Example 5

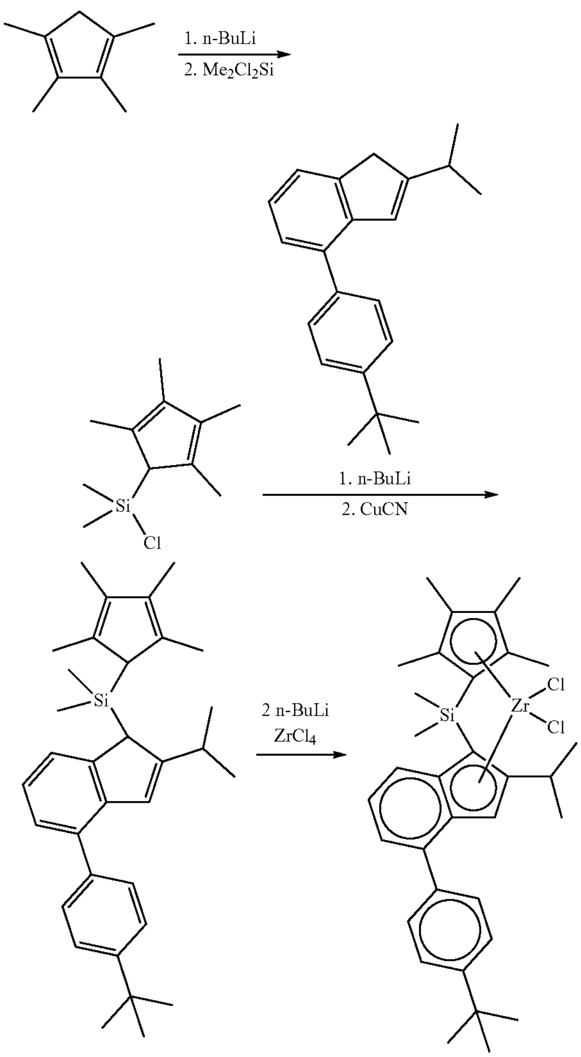

Preparation of (2,3,4,5-tetramethylcyclopentadienyl)(4-(4-(tert-butyl)phenyl)-2-isopropyl-1H-inden-1-yl) dimethylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried to obtain a ligand.

Preparation of dimethyl-silanediyl(2,3,4,5-tetramethylcyclopentadienyl)(4-(4-(tert-butyl)phenyl)-2-isopropyl-1H-inden-1-yl) Zirconium dichloride The ligand was dissolved in a mixed solvent of toluene: ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

Comparative Example 6

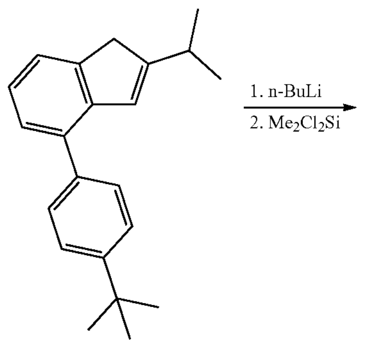

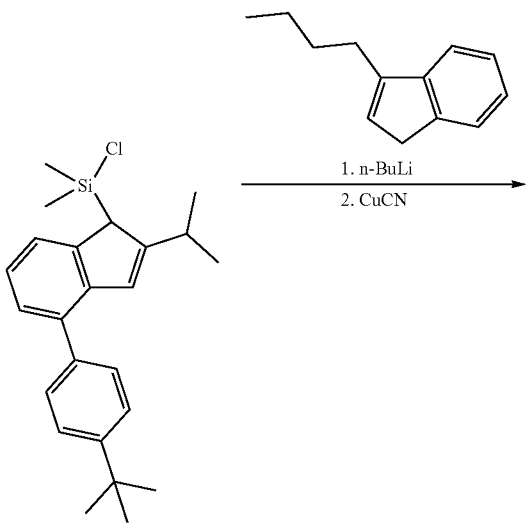

-continued

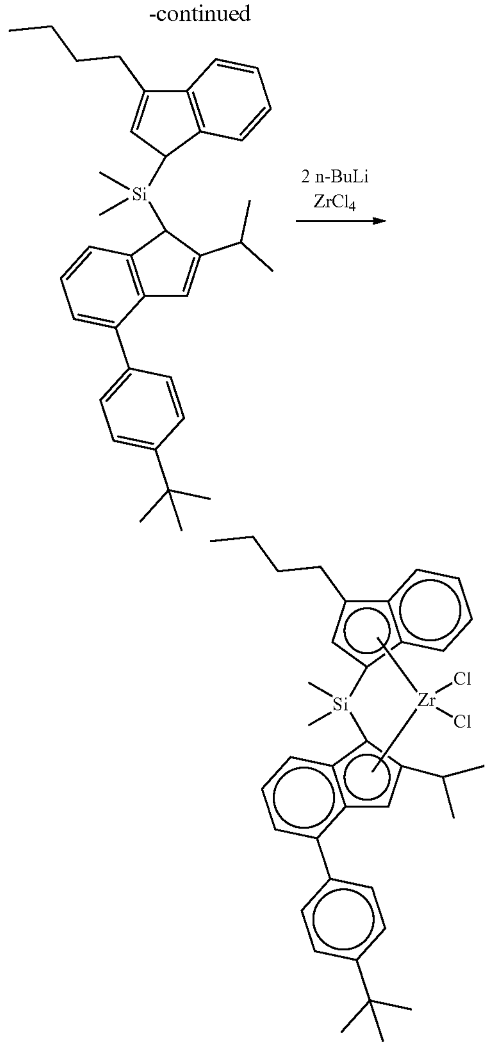

Preparation of (3-Butyl-1H-inden-1-yl)(4-(4-(tert-butyl)phenyl)-2-isopropyl-1H-inden-1-yl)dimethylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 3-Bu-Indene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried to obtain a ligand.

Preparation of dimethyl-silanediyl(3-Butyl-1H-inden-1-yl)(4-(4-(tert-butyl)phenyl)-2-isopropyl-1H-inden-1-yl) Zirconium dichloride The ligand was dissolved in a mixed solvent of toluene: ether (2:1, 0.53 M), and n-BuLi (2.05 eq) was added at −25°

C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

Comparative Example 7

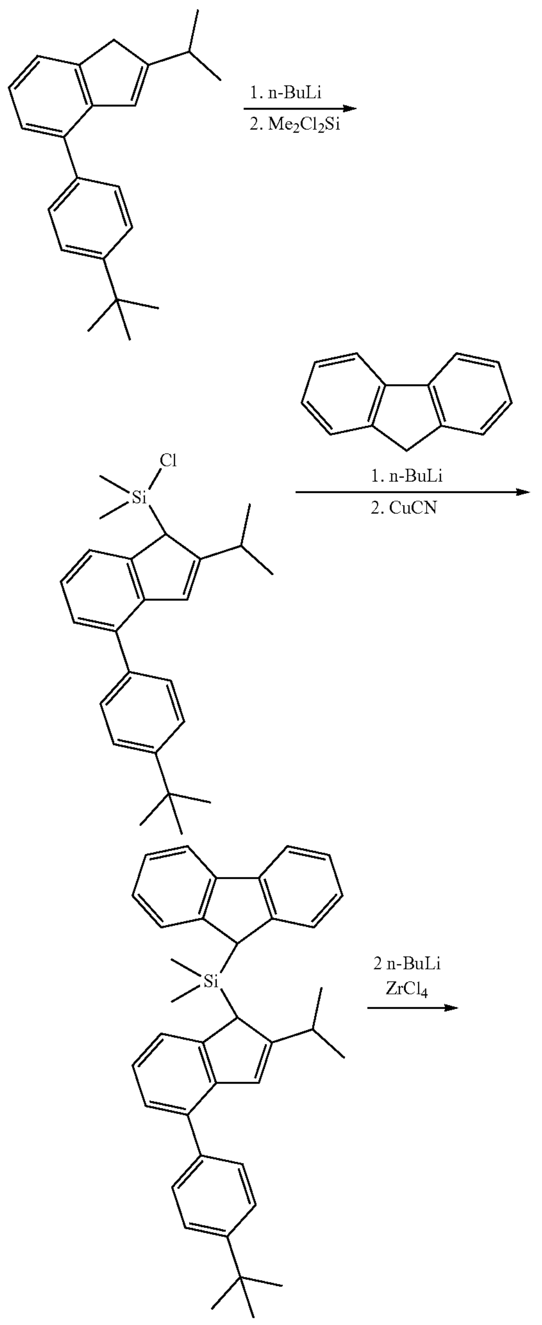

-continued

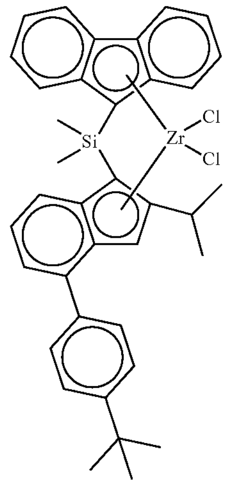

Preparation of (4-(4-(tert-butyl)phenyl)-2-isopropyl-1H-inden-1-yl)(9H-fluoren-9-yl)dimethylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, fluorene (1 eq) was dissolved in a mixed solvent of toluene: THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried to obtain a ligand.

Preparation of dimethyl-silanediyl(4-(4-(tert-butyl) phenyl)-2-isopropyl-1H-inden-1-yl)(9H-fluoren-9-yl) Zirconium dichloride The ligand was dissolved in a mixed solvent of toluene: ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

Comparative Example 8

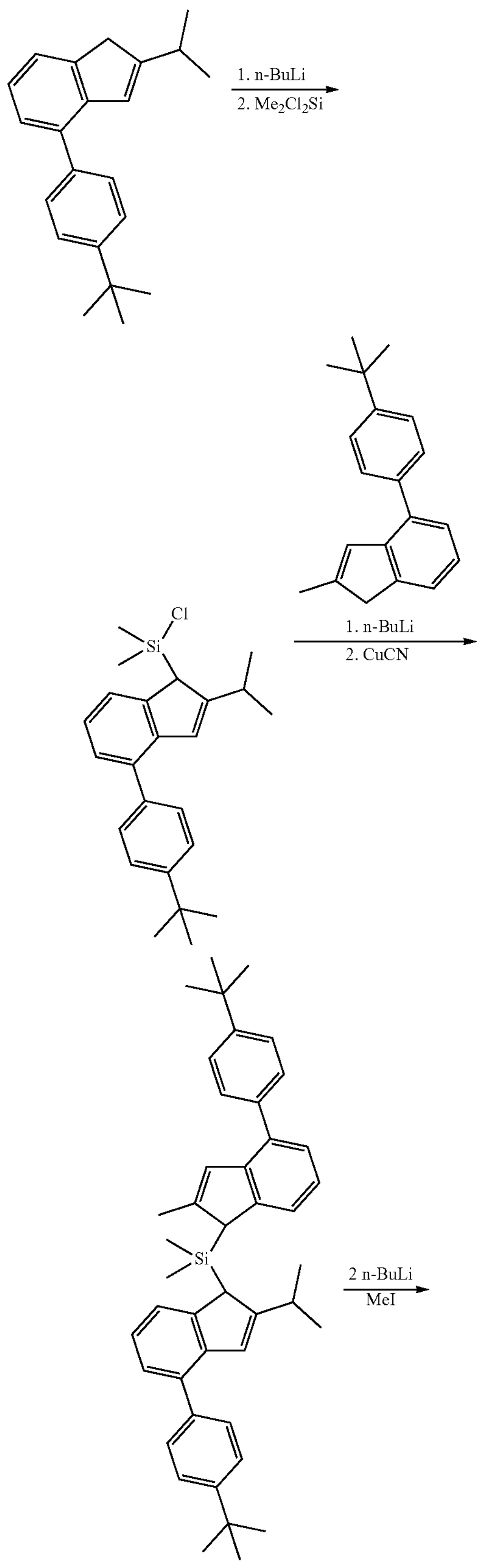

-continued

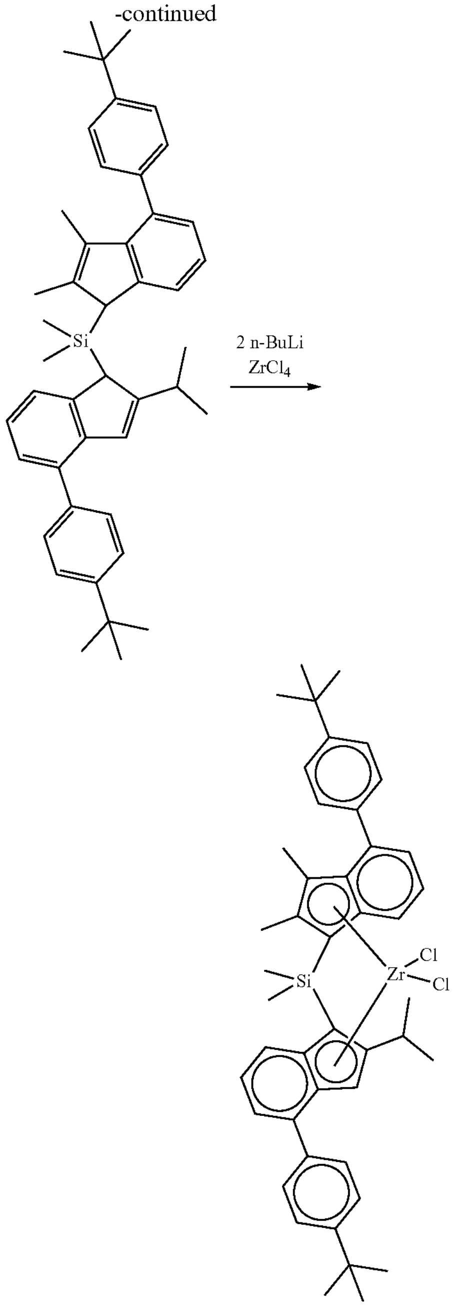

Preparation of (3-Methyl-4-(4-(tert-butyl)phenyl)-2-methyl-1H-inden-1-yl)(4-(4-(tert-butyl)phenyl)-2-isopropyl-1H-inden-1-yl)dimethylsilane 2-iPr-4-tBuPhIndene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-Me-4-tBuPhIndene (1 eq) was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Thereafter, it was stirred overnight at room temperature, worked-up with water and then dried. This was dissolved in a mixed solvent of toluene:THF (2:1, 0.2M), and n-BuLi (2.1 eq) was slowly added dropwise thereto at −25° C., followed by stirring at room temperature for 3 hours. Thereafter, methyliodide (1.05 eq) was dissolved in THF (0.6 M) and added thereto at −25° C. Then, it was stirred overnight at room temperature, worked-up with water, and then dried to obtain a ligand.

Preparation of dimethyl-silanediyl(3-methyl-4-(4-(tert-butyl)phenyl)-2-methyl-1H-inden-1-yl)(4-(4-(tert-butyl)phenyl)-2-isopropyl-1H-inden-1-yl) Zirconium dichloride The ligand was dissolved in a mixed solvent of toluene: ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

$^1$H-NMR (500 MHz, $CDCl_3$): 8.33 (d, 2H), 7.30-7.38 (m, 12H), 6.21 (s, 1H), 2.40 (m, 1H), 2.21 (s, 3H), 1.80 (s, 3H), 1.34 (s, 18H), 0.90 (d, 6H), 0.86 (s, 6H)

Comparative Example 9

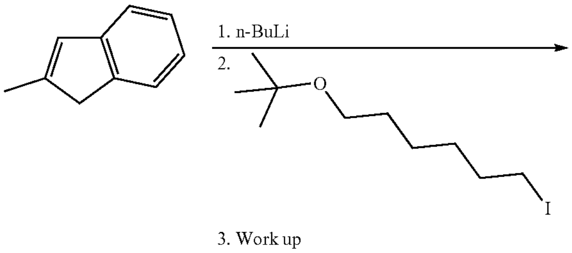

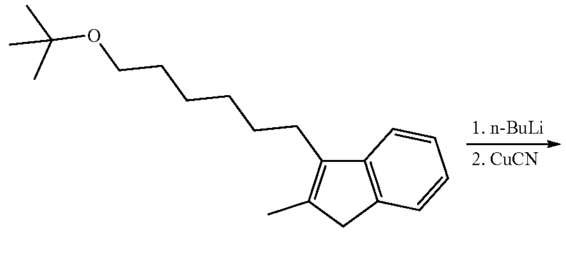

-continued

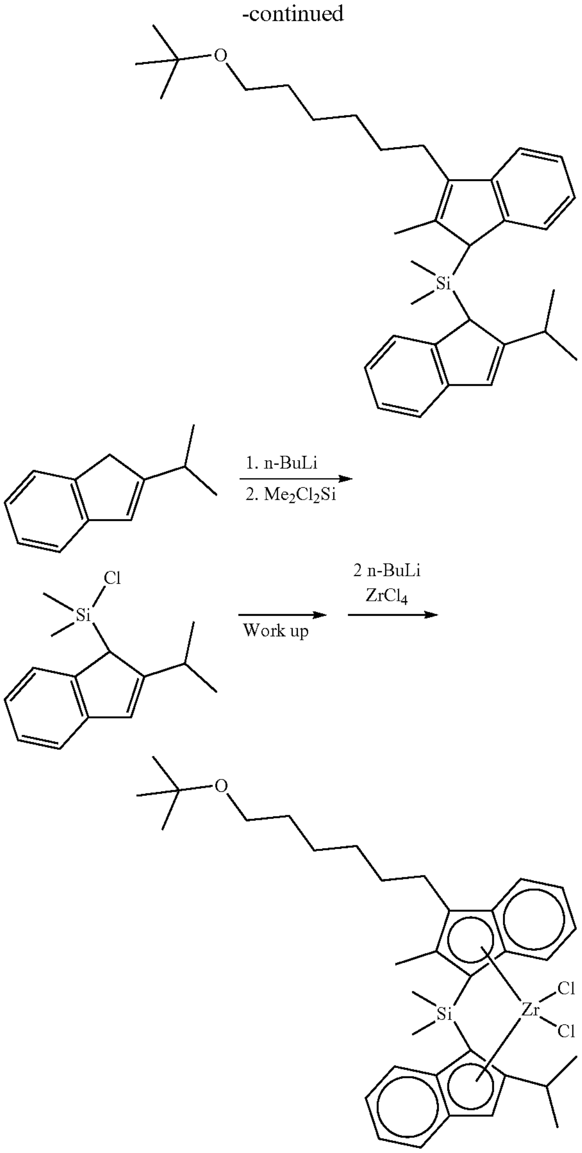

Preparation of (3-(6-(tert-butoxy)hexyl)-2-methyl-1H-inden-1-yl)(2-isopropyl-1H-inden-1-yl)dimethylsilane 2-iPr-Indene (1 eq) was dissolved in a mixed solvent of toluene:THF (10:1, 0.5 M), and n-BuLi (1.05 eq) was slowly added dropwise thereto at −25° C., followed by stirring at room temperature for 3 hours. Thereafter, dichloro dimethyl silane (1.05 eq) was added thereto at −10° C., and stirred overnight at room temperature. In another reactor, 2-Me-Indene (1 eq) was dissolved in a mixed solvent of toluene: THF (2:1, 0.2 M), and n-BuLi (1.05 eq) was slowly added dropwise thereto at −25° C., followed by stirring at room temperature for 3 hours. Thereafter, tert-ButoxyHexyl-Iodide (1.05 eq) was dissolved in THF (0.6 M) and added thereto at −25° C. Then, it was stirred overnight at room temperature, worked-up with water, and then dried. This was dissolved in a mixed solvent of toluene:THF (5:1, 0.7M), and n-BuLi (1.05 eq) was slowly added dropwise thereto at −25° C., followed by stirring at room temperature for 3 hours. Thereafter, CuCN (2 mol %) was added and stirred for 30 minutes, and then the first reaction product, a mono-Si solution, was added thereto. Then, it was stirred overnight at room temperature, worked-up with water, and then dried to obtain a ligand.

Preparation of dimethyl-silanediyl(3-(6-(tert-butoxy) hexyl)-2-methyl-1H-inden-1-yl)(2-isopropyl-1H-inden-1-yl) Zirconium dichloride The ligand was dissolved in a mixed solvent of toluene: ether (2:1, 0.53 M), and n-BuLi (2.05 eq) was added at −25° C., followed by stirring at room temperature for 5 hours. A slurry was prepared by mixing $ZrCl_4$ (1 eq) with toluene (0.17 M) in a flask, and added thereto, followed by stirring overnight at room temperature.

When the reaction was completed, the solvent was vacuum-dried, and DCM was added again. Then, LiCl was removed through a filter, and the filtrate was vacuum-dried. Subsequently, after recrystallization using Hexane/DCM, the resulting solid was filtered and vacuum-dried to obtain a solid transition metal compound.

: 7.37-7.42 (m, 6H), 7.21-7.22 (m, 2H), 6.37 (s, 1H), 3.50 (t, 2H), 2.37 (m, 1H), 2.02 (s, 3H), 1.92 (m, 2H), 1.40-1.50 (m, 8H), 0.98 (d, 6H), 0.85 (s, 6H)

Comparative Example 10

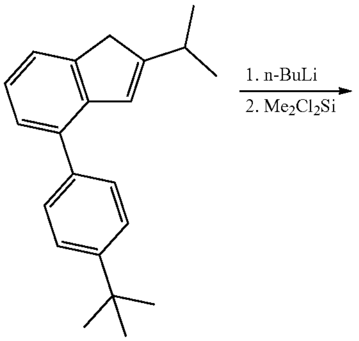

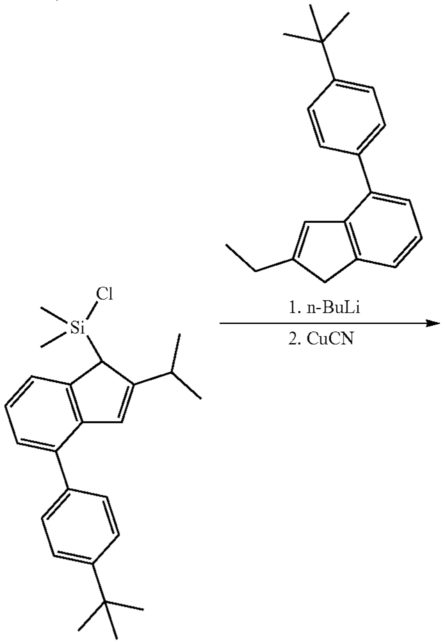

-continued

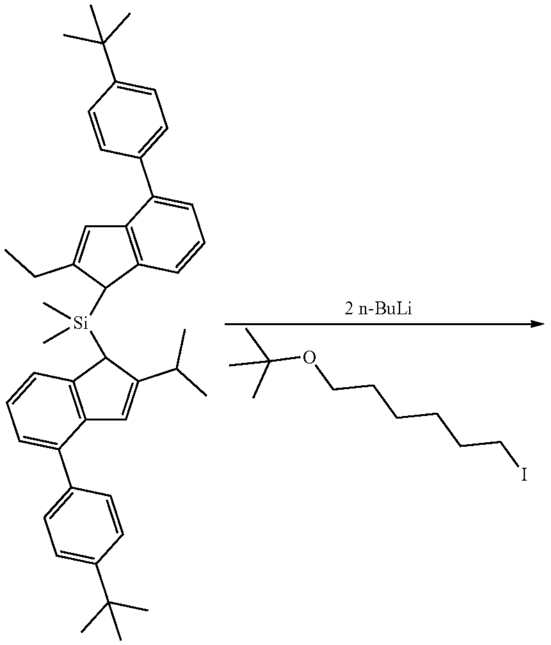

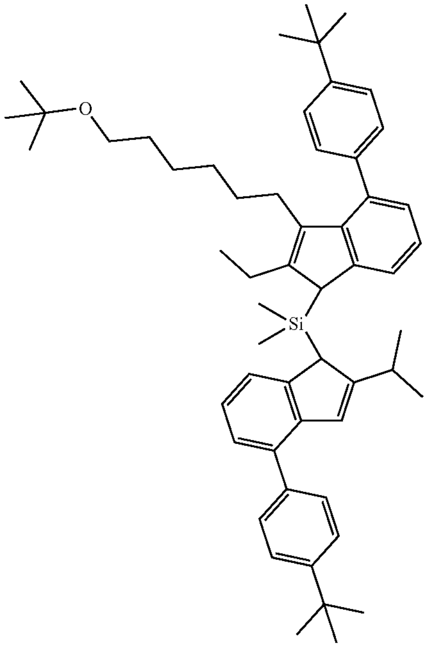

+

-continued

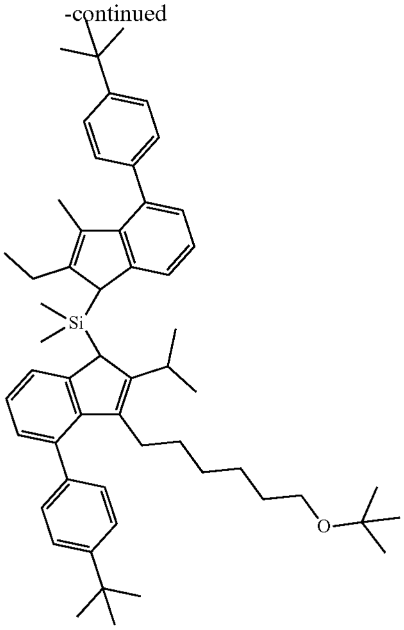

6:4 Mixture

Although it was attempted to synthesize (3-(6-(tert-butoxy)hexyl)-4-(4-(tert-butyl)phenyl)-2-ethyl-1H-inden-1-yl)(4-(4-(tert-butyl)phenyl)-2-isopropyl-1H-inden-1-yl)dimethylsilane ligand, a mixture was produced as shown in the above reaction scheme, and thus the desired ligand could not be obtained.

Preparation of Supported Catalyst

After adding 50 mL of toluene to a Pico reactor (manufactured by Buch), 7 g of silica (Grace, SYLOPOL 952X, calcinated under 250° C.) was added thereto. 10 mmol/g Si of methyl aluminoxane (MAO) was added thereto and reacted at 95° C. for 24 hours. After the reaction mixture was precipitated, the upper layer was removed and the remaining reaction product was washed once with toluene.

60 μmol/g Si of the transition metal compound prepared in one of Examples and Comparative Examples was dissolved in toluene, and then reacted at 80° C. for 2 hours. When the precipitation was completed after the reaction, the upper layer solution was removed and the remaining reaction product was washed with toluene. After washing again with hexane, 2 wt % of an antistatic agent (Atmer 163) was added under hexane, followed by stirring for 10 minutes. After the mixture was precipitated, the upper layer was removed and the remaining reaction product was vacuum-dried to obtain a silica-supported catalyst in the form of solid particles.

Experimental Examples

Preparation of Ethylene-1-Hexene Copolymer

A 600 mL stainless steel reactor was vacuum-dried at 120° C., and then cooled. In this reactor, 1 g of trimethylaluminum (TMA; 1 M in Hexane) was added to 250 g of hexane at room temperature, and stirred for 10 minutes. After removing all of the reacted hexane, 250 g of hexane and 0.5 g of triisobutylaluminum (TIBAL; 1 M in Hexane) were added and stirred for 5 minutes. After adding 7 mg of the supported catalyst, the mixture was stirred while raising the temperature to 70° C. After stopping the stirring at 70° C., 10 mL of 1-hexene was added, and ethylene was filled to 30 bar, followed by stirring. After polymerization for 30 minutes, unreacted ethylene was vented.

The polymerization activity of the supported catalyst including the transition metal compound prepared in one of Examples and Comparative Examples, and physical properties of the ethylene-1-hexene copolymer prepared in the presence of each supported catalyst were evaluated in the following manner. The results are shown in Table 1 below.

(1) Polymerization Activity (kg PP/g cat·hr)

The activity was calculated by a ratio of the weight of the prepared polymer (kg PP) to the mass of the used supported catalyst (g) per unit time (h).

(2) Melting Point (Tm)

The melting point (Tm) of the ethylene-1-hexene copolymer was measured using a differential scanning calorimeter (DSC, device name: DSC 2920, manufacturer: TA instrument). Specifically, after heating the polymer to 200° C. by increasing the temperature, the temperature was maintained at that temperature for 5 minutes, and then lowered to 30° C. Thereafter, the temperature was increased again, and the temperature at the top of the DSC (Differential Scanning calorimeter, manufactured by TA) curve was measured as the melting point (Tm). Herein, the temperature was increased and lowered at a rate of 10° C./min, respectively. The melting point was measured in the section where the temperature rises for the second time.

(3) Weight Average Molecular Weight (Mw, g/mol)

The weight average molecular weight (Mw) was measured using gel permeation chromatography (GPC).

Specifically, PL-GPC220 manufactured by Waters was used as the gel permeation chromatography (GPC) instrument, and a Polymer Laboratories PLgel MIX-B 300 mm length column was used. An evaluation temperature was 160° C., and 1,2,4-trichlorobenzene was used for a solvent at a flow rate of 1 mL/min. Each polymer sample of Examples and Comparative Examples was pretreated by dissolving it in 1,2,4-trichlorobenzene containing 0.0125% of BHT at 160° C. for 10 hours using a GPC analyzer (PL-GP220), and the sample with a concentration of 10 mg/10 mL was supplied in an amount of 200 μL. Mw and Mn were obtained using a calibration curve formed using a polystyrene standard. 9 kinds of the polystyrene standard were used with the molecular weight of 2,000 g/mol, 10,000 g/mol, 30,000 g/mol, 70,000 g/mol, 200,000 g/mol, 700,000 g/mol, 2,000,000 g/mol, 4,000,000 g/mol, and 10,000,000 g/mol.

(4) SCB (Short Chain Branch) Content (the Number of Branches Having 2 to 7 Carbon Atoms Per 1,000 Carbons, Unit: Branch/1,000 C)

The sample was pretreated by dissolving it in 1,2,4-Trichlorobenzene containing 0.0125% of BHT at 160° C. for 10 hours using PL-SP260VS, and then the SCB content was measured at 160° C. using a PerkinElmer Spectrum 100 FT-IR connected to a high-temperature GPC (PL-GPC220).

TABLE 1

| | Activity (kg/g cat · hr) | Tm (° C.) | Mw (g/mol) | SCB (branch/ 1000 C) |
|---|---|---|---|---|
| Example 1 | 4.3 | 126.0 | 618,000 | 4.4 |
| Example 2 | 4.2 | 126.1 | 584,000 | 4.9 |
| Example 3 | 3.8 | 126.0 | 620,000 | 4.8 |
| Example 4 | 3.5 | 125.9 | 580,000 | 4.5 |
| Example 5 | 4.5 | 125.9 | 680,000 | 5.2 |
| Example 6 | 3.6 | 126.0 | 701,000 | 5.5 |
| Example 7 | 5.8 | 126.3 | 555,000 | 4.2 |
| Example 8 | 4.5 | 126.0 | 590,000 | 4.8 |
| Example 9 | 6.1 | 126.0 | 530,000 | 4.2 |
| Example 10 | 5.5 | 126.1 | 662,000 | 5.2 |
| Example 11 | 7.1 | 126.1 | 523,000 | 4.0 |
| Example 12 | 3.0 | 126.3 | 701,000 | 5.8 |
| Example 13 | 3.1 | 126.3 | 670,000 | 5.9 |
| Comparative Example 1 | 4.3 | 122.0 | 354,000 | 5.4 |
| Comparative Example 2 | 3.9 | 123.1 | 380,000 | 4.8 |
| Comparative Example 3 | 3.1 | 124.1 | 393,000 | 4.0 |
| Comparative Example 4 | 1.8 | 123.0 | 338,000 | 4.5 |
| Comparative Example 5 | 1.8 | 128.4 | 364,000 | 1.5 |
| Comparative Example 6 | 0.6 | 128.7 | 329,000 | 2.0 |
| Comparative Example 7 | 0.5 | 124.3 | 373,000 | 2.6 |
| Comparative Example 8 | 3.5 | 127.0 | 500,000 | 2.5 |
| Comparative Example 9 | 2.1 | 127.1 | 400,000 | 2.6 |

Referring to Table 1, it was confirmed that the transition metal compound of Chemical Formula 1 of the present disclosure exhibited excellent catalytic activity of 3.0 kg/g cat·hr, and the ethylene-1-hexene copolymer polymerized in the presence thereof had a high weight average molecular weight of 500,000 g/mol or more and a high SCB content of 4.0 branches/1000 C or more.

However, when the transition metal compound does not satisfy the structure of Chemical Formula 1 of the present disclosure as in Comparative Examples 1 to 9, the catalytic activity was low, the high molecular weight could not be achieved, or the degree of copolymerization was poor.

From the above results, it could be confirmed that the transition metal compound of Chemical Formula 1 of the present disclosure could be used as a high molecular weight and high comonomer incorporation catalyst in the preparation of a polyolefin.

The invention claimed is:

1. A transition metal compound represented by Chemical Formula 1:

[Chemical Formula 1]

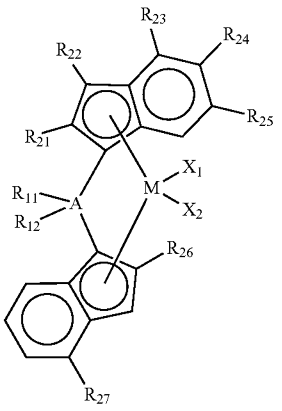

wherein in Chemical Formula 1,

M is a Group 4 transition metal, $X^1$ and $X^2$ are each independently hydrogen; halogen; or $C_{1-20}$ alkyl;

A is carbon or silicon, $R_{11}$ and $R_{12}$ are each independently hydrogen; halogen; $C_{1-20}$ alkyl; $C_{2-20}$ alkoxyalkyl; or $C_{6-20}$ aryl;

$R_{21}$ is methyl, $R_{22}$ is $C_{3-20}$ alkoxyalkyl, $R_{23}$ is unsubstituted $C_{6-20}$ aryl; or $C_{7-20}$ alkylaryl, $R_{24}$ and $R_{25}$ are each hydrogen; or $R_{24}$ and $R_{25}$ are connected with each other to form a $C_{3-10}$ cycloalkane ring, $R_{26}$ is $C_{1-20}$ alkyl, and $R_{27}$ is unsubstituted $C_{6-20}$ aryl; or $C_{7-20}$ alkylaryl.

2. The transition metal compound of claim 1, wherein M is zirconium or hafnium, and $X_1$ and $X_2$ are each independently halogen.

3. The transition metal compound of claim 1, wherein A is silicon, and $R_{11}$ and $R_{12}$ are each independently $C_{1-10}$ alkyl; $C_{2-10}$ alkoxyalkyl; or $C_{6-10}$ aryl.

4. The transition metal compound of claim 1, wherein $R_{22}$ is $C_{3-10}$ alkoxyalkyl.

5. The transition metal compound of claim 1, wherein $R_{23}$ is unsubstituted phenyl; or phenyl substituted with $C_{1-10}$ alkyl.

6. The transition metal compound of claim 1, wherein $R_{24}$ and $R_{25}$ are each hydrogen; or $R_{24}$ and $R_{25}$ are connected with each other to form a cyclopentane ring or a cyclohexane ring.

7. The transition metal compound of claim 1, wherein $R_{27}$ is unsubstituted phenyl; or phenyl substituted with $C_{1-10}$ alkyl.

8. The transition metal compound of claim 1, wherein M is zirconium or hafnium, $X^1$ and $X^2$ are each independently halogen, A is silicon, $R_{11}$ and $R_{12}$ are each independently $C_{1-10}$ alkyl; $C_{2-10}$ alkoxyalkyl; or $C_{6-10}$ aryl, $R_{22}$ is $C_{3-10}$ alkoxyalkyl, $R_{23}$ is unsubstituted phenyl; or phenyl substituted with $C_{1-10}$ alkyl, $R_{24}$ and $R_{25}$ are each hydrogen; or $R_{24}$ and $R_{25}$ are connected with each other to form a cyclopentane ring, or a cyclohexane ring, and $R_{27}$ is unsubstituted phenyl; or phenyl substituted with $C_{1-10}$ alkyl.

9. The transition metal compound of claim 1, wherein the transition metal compound represented by the Chemical Formula 1 is a compound selected from the group consisting of:

-continued
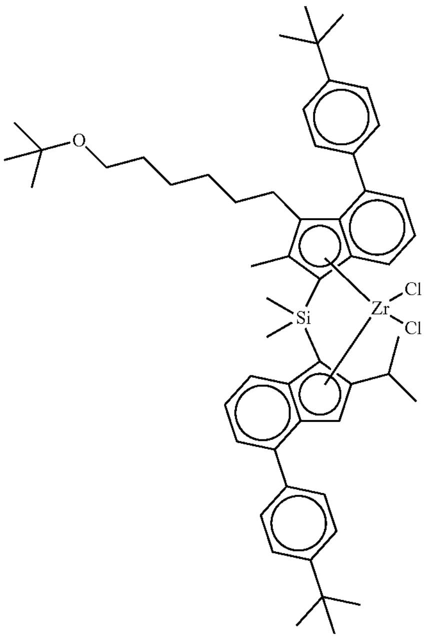
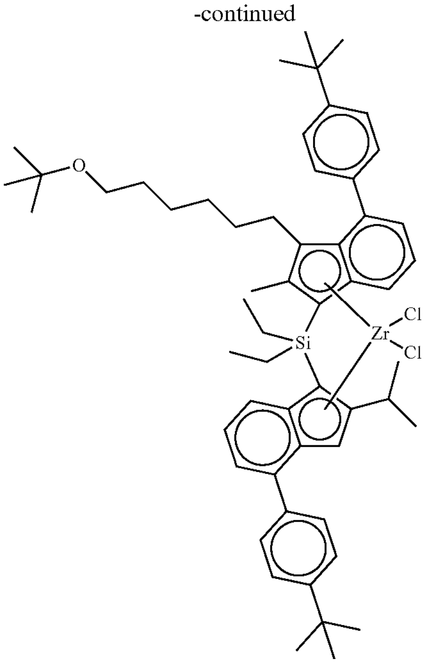
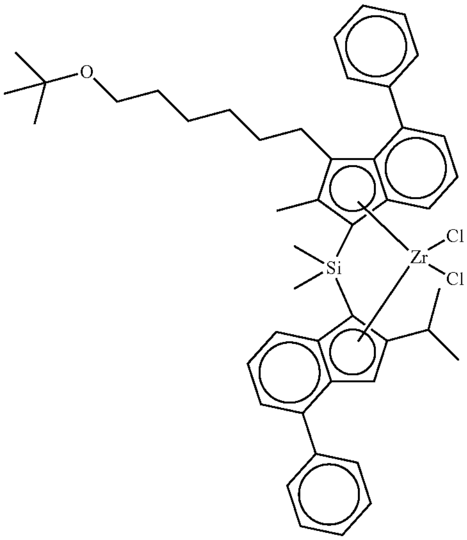
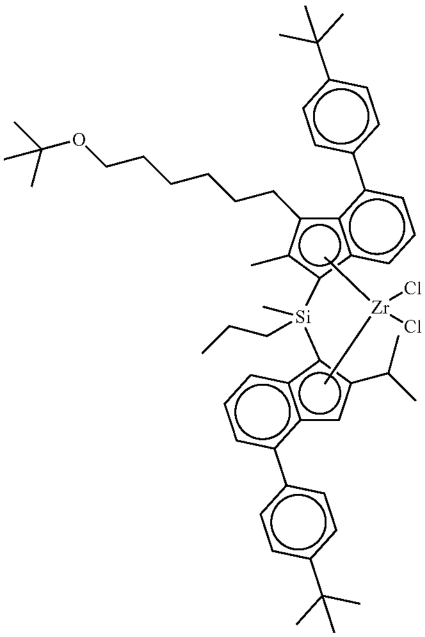

-continued
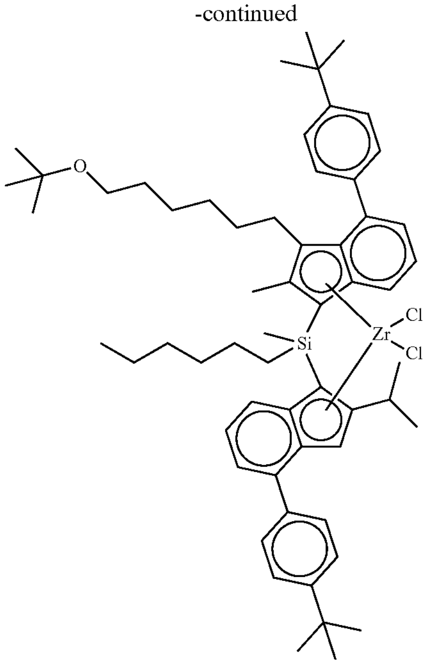
-continued
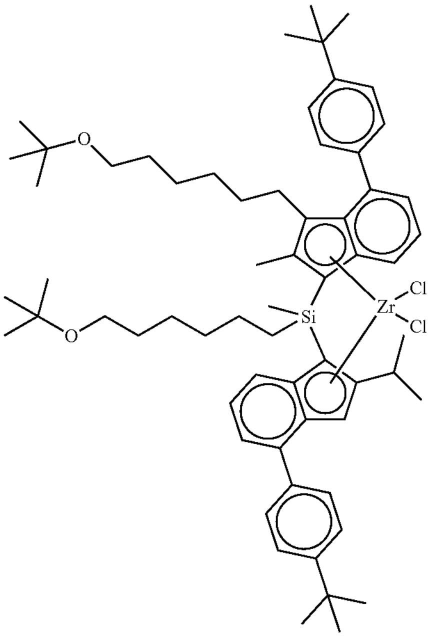
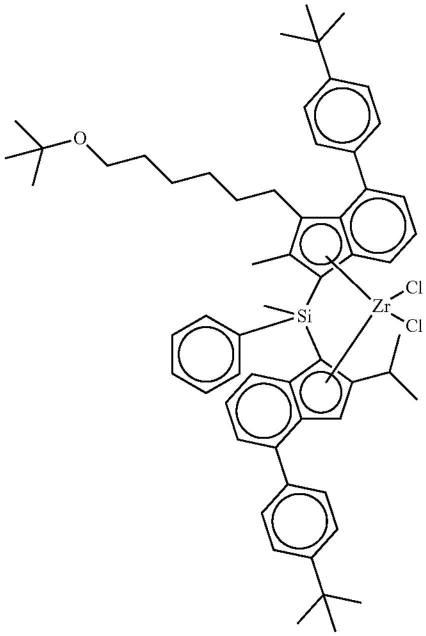
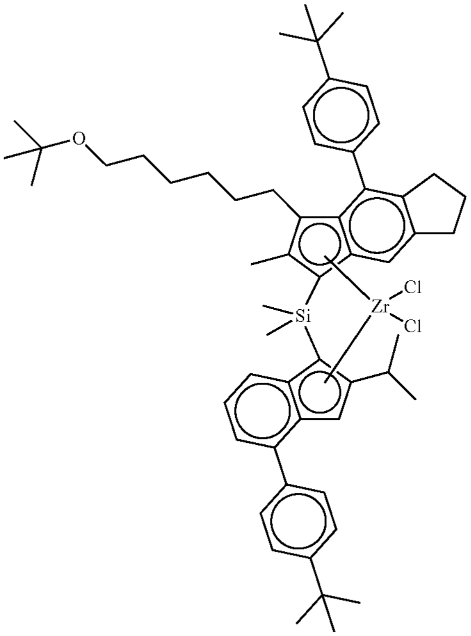

-continued

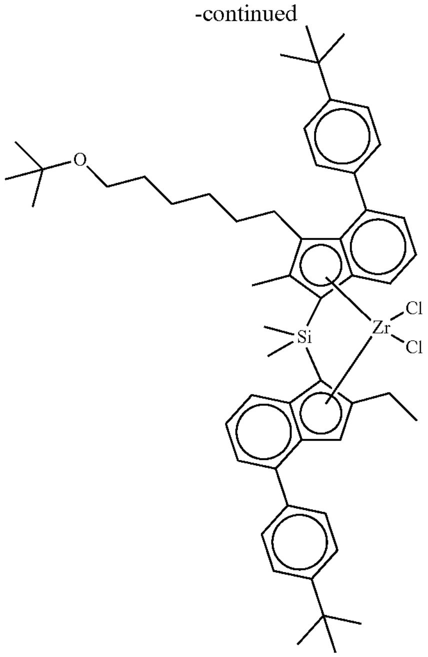

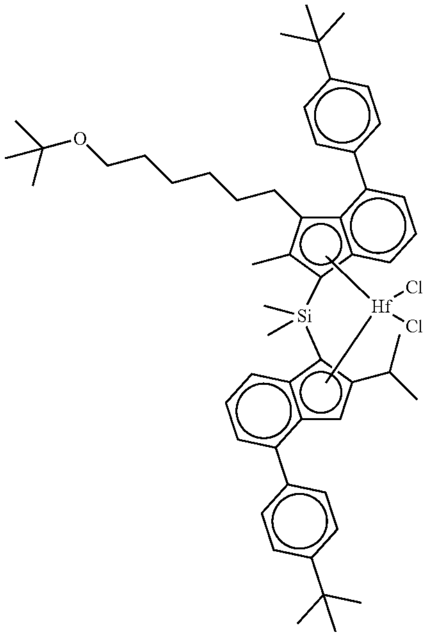

.

10. A method for preparing the transition metal compound of claim 1, comprising the steps of preparing a compound represented by the following Chemical Formula 1-1 by reacting a compound represented by Chemical Formula a with a compound represented by Chemical Formula b;

preparing a compound represented by Chemical Formula 1-2 by reacting a compound represented by the following Chemical Formula 1-1 with a compound represented by Chemical Formula 1-11; and preparing a compound represented by Chemical Formula 1 by reacting a compound represented by Chemical Formula 1-2 with a compound represented by Chemical Formula 1-21:

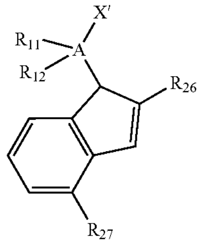

a

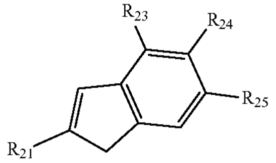

b

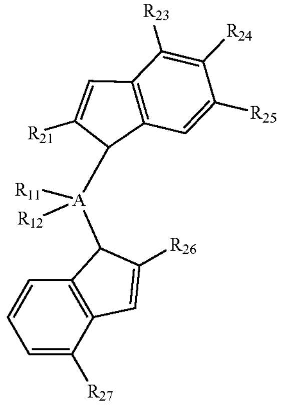

1-1

$X'—R_{22}$ 1-11

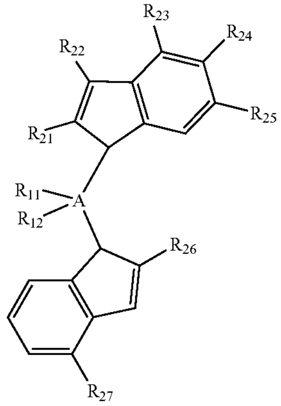

1-2

$M(X_1)(X_2)(X')_2$ 1-21

-continued

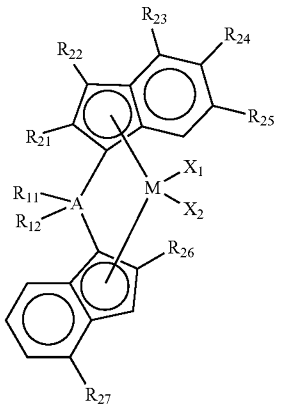

wherein,

M, $X_1$, $X_2$, A, $R_{11}$, $R_{12}$, and $R_{21}$ to $R_{27}$ are as defined in Chemical Formula 1, and each X' is independently halogen.

11. A catalyst composition comprising the transition metal compound of claim 1.

12. The catalyst composition of claim 11, further comprising at least one cocatalyst selected from the group consisting of compounds represented by Chemical Formulae 3 and 4:

$$[Al(R_{31})—O]_m— \quad \text{[Chemical Formula 3]}$$

wherein in Chemical Formula 3, each $R^{31}$ is independently halogen, $C_{1-20}$ alkyl or $C_{1-20}$ haloalkyl; and m is an integer of 2 or more;

$$J(R_{32})_3 \quad \text{[Chemical Formula 4]}$$

wherein in Chemical Formula 4, each $R^{32}$ is independently halogen, $C_{1-20}$ alkyl or $C_{1-20}$ haloalkyl; and J is aluminum or boron.

13. A method for preparing a polyolefin, comprising a step of polymerizing olefinic monomers in the presence of the catalyst composition of claim 11.

* * * * *